(12) United States Patent
Huang et al.

(10) Patent No.: US 12,501,131 B2
(45) Date of Patent: Dec. 16, 2025

(54) SHAPE MEMORY ALLOY MOTOR, MOTOR MODULE, CAMERA COMPACT MODULE, AND ELECTRONIC DEVICE

(71) Applicant: Huawei Technologies Co., Ltd., Shenzhen (CN)

(72) Inventors: Dong Huang, Shanghai (CN); Deliang Li, Shanghai (CN); Gang Wang, Wuhan (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 154 days.

(21) Appl. No.: 18/254,681

(22) PCT Filed: Nov. 26, 2021

(86) PCT No.: PCT/CN2021/133362
§ 371 (c)(1),
(2) Date: May 26, 2023

(87) PCT Pub. No.: WO2022/111614
PCT Pub. Date: Jun. 2, 2022

(65) Prior Publication Data
US 2023/0421873 A1 Dec. 28, 2023

(30) Foreign Application Priority Data

Nov. 28, 2020 (CN) .......................... 202011365693.6

(51) Int. Cl.
| | |
|---|---|
| *H04N 23/52* | (2023.01) |
| *G02B 7/08* | (2021.01) |
| *G02B 27/64* | (2006.01) |
| *G03B 30/00* | (2021.01) |
| *H04M 1/02* | (2006.01) |

(Continued)

(52) U.S. Cl.
CPC .............. *H04N 23/52* (2023.01); *G02B 7/08* (2013.01); *G02B 27/646* (2013.01); *G03B 30/00* (2021.01); *H04M 1/026* (2013.01); *H04M 1/0264* (2013.01); *H04N 23/54* (2023.01);

(Continued)

(58) Field of Classification Search
CPC ........ H04N 23/52; H04N 23/50; H04N 23/51; H04N 23/54; H04N 23/55; H04N 23/57; H04N 25/617; G02B 7/08; G02B 27/646; G03B 30/00; G03B 2205/0076; H04M 1/026; H04M 1/0264
See application file for complete search history.

(56) References Cited

U.S. PATENT DOCUMENTS

2019/0250366 A1* 8/2019 Howarth ................. G03B 3/10
2020/0174274 A1 6/2020 Wang

FOREIGN PATENT DOCUMENTS

| CN | 109302556 A | 2/2019 | |
|---|---|---|---|
| CN | 111385446 A | 7/2020 | |
| WO | WO-2020079425 A2 * | 4/2020 | ............. H04N 23/50 |

* cited by examiner

*Primary Examiner* — Twyler L Haskins
*Assistant Examiner* — Akshay Trehan
(74) *Attorney, Agent, or Firm* — Conley Rose, P.C.

(57) ABSTRACT

A camera compact system includes a shape memory alloy (SMA) motor, a lens array, a plurality of magnetic isolation members, and an image sensor, where the SMA motor is configured to move the lens array; and each of the magnetic isolation members is located between the SMA motor and the image sensor to reduce a degree of magnetic interference to a magnetic sensitive electronic component in the camera compact system.

20 Claims, 24 Drawing Sheets

(51) Int. Cl.
  *H04N 23/54* (2023.01)
  *H04N 23/55* (2023.01)
  *H04N 23/57* (2023.01)
  *H04N 25/617* (2023.01)
(52) U.S. Cl.
  CPC ............. *H04N 23/55* (2023.01); *H04N 23/57* (2023.01); *H04N 25/617* (2023.01); *G03B 2205/0076* (2013.01)

88 μT to 94 μT

82 µT to 88 µT

SHAPE MEMORY ALLOY MOTOR, MOTOR MODULE, CAMERA COMPACT MODULE, AND ELECTRONIC DEVICE

CROSS-REFERENCE TO RELATED APPLICATIONS

This is a U.S. National Stage of International Patent Application No. PCT/CN2021/133362 filed on Nov. 26, 2021, which claims priority to Chinese Patent Application No. 202011365693.6 filed on Nov. 28, 2020. Both of the aforementioned applications are hereby incorporated by reference in their entireties.

TECHNICAL FIELD

This application relates to the field of electronic devices, and more specifically, to a shape memory alloy motor, a motor module, a camera compact module, and an electronic device.

BACKGROUND

A user usually expects that a camera of a mobile phone can implement a plurality of image photographing scenarios, for example, a scenario of photographing a distant-view image, and a scenario of performing close-view photographing by using a wide aperture. A camera compact module that can implement a plurality of image photographing scenarios usually has a large quantity of electrical connection cables with complex cabling. When the electrical connection cables are connected to a low-frequency current, the electrical connection cables may generate an induced magnetic field. The induced magnetic field affects normal working of a magnetic sensitive electronic component (for example, an image sensor or a power supply of the image sensor) in the camera compact module.

SUMMARY

This application provides a shape memory alloy motor, a motor module, a camera compact module, and an electronic device, which can reduce magnetic interference to a magnetic sensitive electronic component in the camera compact module.

According to a first aspect, a camera compact module is provided, including:
- a camera housing;
- a lens array, where the lens array is at least partially located in the camera housing;
- a circuit board, where an image sensor is disposed on the circuit board;
- a shape memory alloy SMA motor, where the SMA motor is accommodated in the camera housing, the SMA motor includes an SMA cable, one end of the SMA cable is connected to the lens array, and the other end of the SMA cable is fixed relative to the camera housing;
- an SMA motor driver module, where the SMA motor driver module is disposed on the circuit board and is configured to provide an alternating current power supply for the SMA motor, the SMA motor driver module includes a first electrical connection port and a second electrical connection port, and the first electrical connection port and the second electrical connection port are electrically connected to the two ends of the SMA cable respectively; and
- a first magnetic isolation member, where the first magnetic isolation member is disposed in parallel with the image sensor, the first magnetic isolation member includes a first through hole, light incident to the camera compact module is projected onto the image sensor through the first through hole, and a shape of the first through hole corresponds to a shape of the image sensor.

In this application, the first magnetic isolation member is disposed between the image sensor and the SMA motor, thereby being conducive to reducing magnetic interference to a magnetic sensitive electronic component in the camera compact module. In addition, because the first magnetic isolation member may be closer to the image sensor, an interference magnetic field generated by the SMA motor may be smaller at the first magnetic isolation member, thereby being conducive to further reducing a degree of the magnetic interference to the magnetic sensitive electronic component in the camera compact module.

With reference to the first aspect, in some implementations of the first aspect, the camera compact module further includes:
- a second magnetic isolation member, where the second magnetic isolation member is disposed in parallel with the image sensor, the second magnetic isolation member is located between the first magnetic isolation member and the SMA motor, the second magnetic isolation member includes a second through hole, and the lens array passes through the second through hole.

In this application, a plurality of magnetic isolation members are disposed between the image sensor and the SMA motor, thereby being conducive to significantly reducing the magnetic interference to the magnetic sensitive electronic component in the camera compact module.

In this application, because the second magnetic isolation member may be closer to the lens array, the first magnetic isolation member may be closer to the image sensor, a distance between the second magnetic isolation member and the first magnetic isolation member may be larger, and the interference magnetic field generated by the SMA motor may be smaller at the first magnetic isolation member, thereby being conducive to further reducing the magnetic interference to the magnetic sensitive electronic component in the camera compact module.

With reference to the first aspect, in some implementations of the first aspect, the second magnetic isolation member includes:
- a second magnetic isolation board, where the second magnetic isolation board is disposed in parallel with the image sensor, and the second through hole is located on the second magnetic isolation board; and
- at least one second magnetic isolation edge, where the second magnetic isolation edge is perpendicularly disposed on the second magnetic isolation board and is located on a side that is of the second magnetic isolation board and that is away from the image sensor, and the second magnetic isolation edge surrounds a periphery of the second through hole.

In this application, a magnetic isolation edge is disposed on the second magnetic isolation member, so that a magnetic isolation region of the second magnetic isolation member is increased, and a magnetic isolation effect may also be implemented in a direction perpendicular to the second magnetic isolation board, thereby being conducive to further reducing the magnetic interference to the magnetic sensitive electronic component in the camera compact module.

With reference to the first aspect, in some implementations of the first aspect, an inner wall of the second magnetic isolation edge is in communication with a hole wall of the second through hole.

With reference to the first aspect, in some implementations of the first aspect, the at least one second magnetic isolation edge includes a target second magnetic isolation edge, and the target second magnetic isolation edge and a pin of the image sensor are located on a same side of the camera compact module.

In this application, the magnetic isolation edge is disposed at a position of the magnetic sensitive electronic component, thereby being conducive to improving a magnetic isolation effect of the second magnetic isolation member and further reducing the degree of the magnetic interference to the magnetic sensitive electronic component in the camera compact module.

With reference to the first aspect, in some implementations of the first aspect, the at least one second magnetic isolation edge satisfies the following:
 the at least one second magnetic isolation edge is symmetrically disposed relative to the second through hole; and
 the at least one second magnetic isolation edge is distributed at an equal spacing on the periphery of the second through hole.

In this application, distribution of the second magnetic isolation edge is flexibly arranged, thereby being conducive to flexibly adjusting the magnetic isolation effect of the second magnetic isolation member.

With reference to the first aspect, in some implementations of the first aspect, the second magnetic isolation member satisfies at least one of the following:
 a thickness of the second magnetic isolation board is greater than or equal to 0.1 mm; and
 a height of the second magnetic isolation edge is greater than or equal to 0.1 mm.

In this application, a structure of the second magnetic isolation member is disposed, thereby being conducive to improving the magnetic isolation effect of the second magnetic isolation member and further reducing the degree of the magnetic interference to the magnetic sensitive electronic component in the camera compact module.

With reference to the first aspect, in some implementations of the first aspect, the camera compact module satisfies at least one of the following:
 a relative magnetic permeability of the second magnetic isolation member is greater than 5; and
 a distance between the second magnetic isolation member and the first magnetic isolation member is greater than or equal to 0.1 mm.

Optionally, within 0 MHz to 1 MHz, the relative magnetic permeability of the second magnetic isolation member is greater than 5.

In this application, the structure and performance of the second magnetic isolation member are disposed, thereby being conducive to improving the magnetic isolation effect of the second magnetic isolation member and further reducing the degree of the magnetic interference to the magnetic sensitive electronic component in the camera compact module.

With reference to the first aspect, in some implementations of the first aspect, the first magnetic isolation member includes:
 a first magnetic isolation board, where the first magnetic isolation board is disposed in parallel with the image sensor, and the first through hole is located on the first magnetic isolation board; and
 at least one first magnetic isolation edge, where the first magnetic isolation edge is located on a side that is of the first magnetic isolation board and that is away from the image sensor, the first magnetic isolation edge is disposed perpendicular to the first magnetic isolation board, and the first magnetic isolation edge surrounds a periphery of the first through hole.

In this application, a magnetic isolation edge is disposed on the first magnetic isolation member, so that a magnetic isolation region of the first magnetic isolation member is increased, and a magnetic isolation effect may also be implemented in a direction perpendicular to the first magnetic isolation board, thereby being conducive to further reducing the degree of the magnetic interference to the magnetic sensitive electronic component in the camera compact module.

With reference to the first aspect, in some implementations of the first aspect, an inner wall of the first magnetic isolation edge is in communication with a hole wall of the first through hole.

With reference to the first aspect, in some implementations of the first aspect, the camera compact module satisfies at least one of the following:
 a relative magnetic permeability of the first magnetic isolation member is greater than 5;
 a distance between the first magnetic isolation member and the image sensor is greater than or equal to 0.1 mm;
 a distance between the first magnetic isolation member and the circuit board is greater than or equal to 0.1 mm; and
 an outer contour of a projection region of the first through hole on the circuit board is a first outer contour, an outer contour of a projection region of the image sensor on the circuit board is a second outer contour, the second outer contour is located in the first outer contour, and a maximum distance between the second outer contour and the first outer contour is less than or equal to 1.5 mm.

Optionally, within 0 MHz to 1 MHz, the relative magnetic permeability of the first magnetic isolation member is greater than 5.

In this application, a structure and performance of the first magnetic isolation member are disposed, thereby being conducive to improving the magnetic isolation effect of the first magnetic isolation member and further reducing the magnetic interference to the magnetic sensitive electronic component in the camera compact module.

With reference to the first aspect, in some implementations of the first aspect, the camera compact module further includes:
 a holder, where the holder is located between the image sensor and the SMA motor, and the first magnetic isolation member is located in the holder or is attached to a surface of the holder.

In this application, a disposition position of the first magnetic isolation member relative to the holder is flexibly arranged, thereby being conducive to improving integration of the camera compact module. In addition, it is conducive to ensuring that a specific distance exists between the first magnetic isolation member and the image sensor, thereby reducing impact of an interference magnetic field generated by the first magnetic isolation member on the image sensor.

According to a second aspect, a camera compact module is provided, including:
 a camera housing;
 a lens array, where the lens array is at least partially located in the camera housing;
 a circuit board, where an image sensor is disposed on the circuit board;
 a shape memory alloy SMA motor, where the SMA motor is accommodated in the camera housing, the SMA motor includes an SMA cable, one end of the SMA cable is connected to the lens array, and the other end of the SMA cable is fixed relative to the camera housing;
 an SMA motor driver module, where the SMA motor driver module is disposed on the circuit board and is configured to provide an alternating current power supply for the SMA motor, the SMA motor driver module includes a first electrical connection port and a second electrical connection port, and the first electrical connection port and the second electrical connection port are electrically connected to the two ends of the SMA cable respectively; and
 a second magnetic isolation member, where the second magnetic isolation member includes a second magnetic isolation board and at least one second magnetic isolation edge, the second magnetic isolation board is disposed in parallel with the image sensor, the second magnetic isolation board includes a second through hole, light incident to the camera compact module is projected onto the image sensor through the second through hole, the second magnetic isolation edge is perpendicularly disposed on the second magnetic isolation board, the second magnetic isolation edge surrounds a periphery of the second through hole, and the second magnetic isolation edge is located on a side that is of the second magnetic isolation board and that is away from the image sensor.

In this application, the second magnetic isolation member is disposed between the image sensor and the SMA motor, thereby being conducive to significantly reducing magnetic interference to a magnetic sensitive electronic component in the camera compact module. In addition, a magnetic isolation edge is disposed on the second magnetic isolation member, so that a magnetic isolation region of the second magnetic isolation member is increased, and a magnetic isolation effect may also be implemented in a direction perpendicular to the second magnetic isolation board, thereby being conducive to reducing the magnetic interference to the magnetic sensitive electronic component in the camera compact module.

With reference to the second aspect, in some implementations of the second aspect, the lens array passes through the second through hole.

In this application, because the second magnetic isolation member may be closer to the lens array, the second magnetic isolation member may be relatively away from the image sensor, thereby being conducive to ensuring that a specific distance exists between the second magnetic isolation member and the image sensor and further reducing impact of an interference magnetic field generated by the second magnetic isolation member on the image sensor.

With reference to the second aspect, in some implementations of the second aspect, an inner wall of the second magnetic isolation edge is in communication with a hole wall of the second through hole.

With reference to the second aspect, in some implementations of the second aspect, the at least one second magnetic isolation edge includes a target second magnetic isolation edge, and the target second magnetic isolation edge and a pin of the image sensor are located on a same side of the camera compact module.

In this application, a magnetic isolation edge is disposed at a position of the magnetic sensitive electronic component, thereby being conducive to improving a magnetic isolation effect of the second magnetic isolation member and further reducing the magnetic interference to the magnetic sensitive electronic component in the camera compact module.

With reference to the second aspect, in some implementations of the second aspect, the at least one second magnetic isolation edge satisfies the following:
 the at least one second magnetic isolation edge is symmetrically disposed relative to the second through hole; and
 the at least one second magnetic isolation edge is distributed at an equal spacing on the periphery of the second through hole.

In this application, distribution of the second magnetic isolation edge is flexibly arranged, thereby being conducive to flexibly adjusting the magnetic isolation effect of the second magnetic isolation member.

With reference to the second aspect, in some implementations of the second aspect, the second magnetic isolation board satisfies at least one of the following:
 a thickness of the second magnetic isolation board is greater than or equal to 0.1 mm; and
 a height of the second magnetic isolation edge is greater than or equal to 0.1 mm.

In this application, a structure of the second magnetic isolation member is disposed, thereby being conducive to improving the magnetic isolation effect of the second magnetic isolation member and further reducing the magnetic interference to the magnetic sensitive electronic component in the camera compact module.

With reference to the second aspect, in some implementations of the second aspect, the camera compact module satisfies at least one of the following:
 a relative magnetic permeability of the second magnetic isolation member is greater than 5;
 a distance between the second magnetic isolation member and the circuit board is greater than or equal to 0.1 mm; and
 a distance between the second magnetic isolation member and the image sensor is greater than or equal to 0.1 mm.

Optionally, within 0 MHz to 1 MHz, the relative magnetic permeability of the second magnetic isolation member is greater than 5.

In this application, the structure and performance of the second magnetic isolation member are disposed, thereby being conducive to improving the magnetic isolation effect of the second magnetic isolation member and further reducing the magnetic interference to the magnetic sensitive electronic component in the camera compact module.

According to a third aspect, a motor module is provided. The motor module is used in an electronic device, the electronic device includes a circuit board, an image sensor and a driver module of the motor module are disposed on the circuit board, the driver module provides an alternating current power supply for the motor module, the driver module includes a first electrical connection port and a second electrical connection port, and the motor module includes:
 a lens tube;
 a lens array, where the lens array is accommodated in the lens tube;

a shape memory alloy SMA motor, where the SMA motor is accommodated in the lens tube, the SMA motor includes an SMA cable, one end of the SMA cable is connected to the lens array, the other end of the SMA cable is fixed relative to the lens tube, and the two ends of the SMA cable are electrically connected to the first electrical connection port and the second electrical connection port respectively; and a first magnetic isolation member, where the first magnetic isolation member is accommodated in the lens tube and is disposed perpendicular to an optical axis of the lens array, the first magnetic isolation member includes a first through hole, light incident to the motor module continues to pass through the first through hole through the SMA motor, and a shape of the first through hole corresponds to a shape of the image sensor.

With reference to the third aspect, in some implementations of the third aspect, the motor module further includes:

a second magnetic isolation member, where the second magnetic isolation member is accommodated in the lens tube and is disposed perpendicular to the optical axis of the lens array, the second magnetic isolation member is located between the first magnetic isolation member and the SMA motor, the second magnetic isolation member includes a second through hole, and the lens array passes through the second through hole.

With reference to the third aspect, in some implementations of the third aspect, the second magnetic isolation member includes:

a second magnetic isolation board, where the second magnetic isolation board is disposed perpendicular to the optical axis of the lens array, and the second through hole is located on the second magnetic isolation board; and at least one second magnetic isolation edge, where the second magnetic isolation edge is perpendicularly disposed on the second magnetic isolation board and is located on a side that is of the second magnetic isolation board and that is away from the first magnetic isolation member, and the second magnetic isolation edge surrounds a periphery of the second through hole.

With reference to the third aspect, in some implementations of the third aspect, an inner wall of the second magnetic isolation edge is in communication with a hole wall of the second through hole.

With reference to the third aspect, in some implementations of the third aspect, the at least one second magnetic isolation edge satisfies the following:

the at least one second magnetic isolation edge is symmetrically disposed relative to the second through hole; and the at least one second magnetic isolation edge is distributed at an equal spacing on the periphery of the second through hole.

With reference to the third aspect, in some implementations of the third aspect, the second magnetic isolation board satisfies at least one of the following:

a thickness of the second magnetic isolation board is greater than or equal to 0.1 mm; and a height of the second magnetic isolation edge is greater than or equal to 0.1 mm.

With reference to the third aspect, in some implementations of the third aspect, the motor module satisfies at least one of the following:

a relative magnetic permeability of the second magnetic isolation member is greater than 5; and a distance between the second magnetic isolation member and the first magnetic isolation member is greater than or equal to 0.1 mm.

Optionally, within 0 MHz to 1 MHz, the relative magnetic permeability of the second magnetic isolation member is greater than 5.

With reference to the third aspect, in some implementations of the third aspect, the first magnetic isolation member includes:

a first magnetic isolation board, where the first magnetic isolation board is disposed perpendicular to the optical axis of the lens array, and the first through hole is located on the first magnetic isolation board; and at least one first magnetic isolation edge, where the first magnetic isolation edge is located on a side that is of the first magnetic isolation board and that is close to the second magnetic isolation member, the first magnetic isolation edge is disposed perpendicular to the first magnetic isolation board, and the first magnetic isolation edge surrounds a periphery of the first through hole.

With reference to the third aspect, in some implementations of the third aspect, an inner wall of the first magnetic isolation edge is in communication with a hole wall of the first through hole.

With reference to the third aspect, in some implementations of the third aspect, the motor module satisfies at least one of the following:

a relative magnetic permeability of the first magnetic isolation member is greater than 5.

Optionally, within 0 MHz to 1 MHz, the relative magnetic permeability of the first magnetic isolation member is greater than 5.

With reference to the third aspect, in some implementations of the third aspect, the motor module further includes:

a holder, where the first magnetic isolation member is located in the holder or is attached to a surface of the holder.

According to a fourth aspect, a motor module is provided. The motor module is used in an electronic device, the electronic device includes a circuit board, an image sensor and a driver module of the motor module are disposed on the circuit board, the driver module provides an alternating current power supply for the motor module, the driver module includes a first electrical connection port and a second electrical connection port, and the motor module includes:

a lens tube;

a lens array, where the lens array is accommodated in the lens tube;

a shape memory alloy SMA motor, where the SMA motor is accommodated in the lens tube, the SMA motor includes an SMA cable, one end of the SMA cable is connected to the lens array, the other end of the SMA cable is fixed relative to the lens tube, and the two ends of the SMA cable are electrically connected to the first electrical connection port and the second electrical connection port respectively; and a second magnetic isolation member, where the second magnetic isolation member is accommodated in the lens tube, the second magnetic isolation member includes a second magnetic isolation board and at least one second magnetic isolation edge, the second magnetic isolation board is disposed perpendicular to an optical axis of the lens array, the second magnetic isolation board includes a second through hole, light incident to the motor module is incident to the second through hole through the SMA motor, the second magnetic isolation edge is perpendicularly disposed on the second magnetic isolation board, and the second magnetic isolation edge is located on a side that is of the second magnetic isolation board and that is close to the SMA motor.

With reference to the fourth aspect, in some implementations of the fourth aspect, the lens array passes through the second through hole.

With reference to the fourth aspect, in some implementations of the fourth aspect, the second magnetic isolation member includes:
 a second magnetic isolation board, where the second magnetic isolation board is disposed perpendicular to the optical axis of the lens array, and the second through hole is located on the second magnetic isolation board; and
 at least one second magnetic isolation edge, where the second magnetic isolation edge is perpendicularly disposed on the second magnetic isolation board and is located on a side that is of the second magnetic isolation board and that is close to the SMA motor, and the second magnetic isolation edge surrounds a periphery of the second through hole.

With reference to the fourth aspect, in some implementations of the fourth aspect, an inner wall of the second magnetic isolation edge is in communication with a hole wall of the second through hole.

With reference to the fourth aspect, in some implementations of the fourth aspect, the at least one second magnetic isolation edge satisfies the following:
 the at least one second magnetic isolation edge is symmetrically disposed relative to the second through hole; and
 the at least one second magnetic isolation edge is distributed at an equal spacing on the periphery of the second through hole.

With reference to the fourth aspect, in some implementations of the fourth aspect, the second magnetic isolation member satisfies at least one of the following:
 a thickness of the second magnetic isolation board is greater than or equal to 0.1 mm;
 a height of the second magnetic isolation edge is greater than or equal to 0.1 mm; and
 a relative magnetic permeability of the second magnetic isolation member is greater than 5.

Optionally, within 0 MHz to 1 MHz, the relative magnetic permeability of the second magnetic isolation member is greater than 5.

According to a fifth aspect, a shape memory alloy SMA motor is provided. The SMA motor is used in a photographing apparatus, the photographing apparatus includes a lens array, an image sensor, and an SMA motor driver module, the SMA motor driver module is configured to provide an alternating current power supply for the SMA motor, the SMA motor driver module includes a first electrical connection port and a second electrical connection port, and the SMA motor includes:
 an SMA cable, where one end of the SMA cable is configured to be connected to the lens array, the other end of the SMA cable is fixed relative to the photographing apparatus, and the two ends of the SMA cable are electrically connected to the first electrical connection port and the second electrical connection port respectively; and
 a first magnetic isolation member, where the first magnetic isolation member is disposed perpendicular to an optical axis of the photographing apparatus, the first magnetic isolation member includes a first through hole, light incident to the photographing apparatus is incident to the image sensor by passing through the first through hole, and a shape of the first through hole corresponds to a shape of the image sensor.

With reference to the fifth aspect, in some implementations of the fifth aspect, the SMA motor further includes:
 a second magnetic isolation member, where the second magnetic isolation member is disposed perpendicular to the optical axis of the photographing apparatus, the second magnetic isolation member is located between the first magnetic isolation member and the SMA cable, the second magnetic isolation member includes a second through hole, and the second through hole is configured to pass through the lens array.

With reference to the fifth aspect, in some implementations of the fifth aspect, the second magnetic isolation member includes:
 a second magnetic isolation board, where the second magnetic isolation board is disposed perpendicular to the optical axis of the photographing apparatus, and the second through hole is located on the second magnetic isolation board; and
 at least one second magnetic isolation edge, where the second magnetic isolation edge is perpendicularly disposed on the second magnetic isolation board and is located on a side that is of the second magnetic isolation board and that is away from the first magnetic isolation member, and the second magnetic isolation edge surrounds a periphery of the second through hole.

With reference to the fifth aspect, in some implementations of the fifth aspect, an inner wall of the second magnetic isolation edge is in communication with a hole wall of the second through hole.

With reference to the fifth aspect, in some implementations of the fifth aspect, the at least one second magnetic isolation edge satisfies the following:
 the at least one second magnetic isolation edge is symmetrically disposed relative to the second through hole; and
 the at least one second magnetic isolation edge is distributed at an equal spacing on the periphery of the second through hole.

With reference to the fifth aspect, in some implementations of the fifth aspect, the second magnetic isolation board satisfies at least one of the following:
 a thickness of the second magnetic isolation board is greater than or equal to 0.1 mm; and
 a height of the second magnetic isolation edge is greater than or equal to 0.1 mm.

With reference to the fifth aspect, in some implementations of the fifth aspect, the SMA motor satisfies at least one of the following:
 a relative magnetic permeability of the second magnetic isolation member is greater than 5; and
 a distance between the second magnetic isolation member and the first magnetic isolation member is greater than or equal to 0.1 mm.

Optionally, within 0 MHz to 1 MHz, the relative magnetic permeability of the second magnetic isolation member is greater than 5.

With reference to the fifth aspect, in some implementations of the fifth aspect, the first magnetic isolation member includes:
 a first magnetic isolation board, where the first magnetic isolation board is disposed perpendicular to the optical axis of the photographing apparatus, and the first through hole is located on the first magnetic isolation board; and at least one first magnetic isolation edge, where the first magnetic isolation edge is located on a side that is of the first magnetic isolation board and that is close to the second magnetic isolation member, the first magnetic isolation edge is disposed perpendicular to the first magnetic isolation board, and the first magnetic isolation edge surrounds a periphery of the first through hole.

With reference to the fifth aspect, in some implementations of the fifth aspect, an inner wall of the first magnetic isolation edge is in communication with a hole wall of the first through hole.

With reference to the fifth aspect, in some implementations of the fifth aspect, the SMA motor satisfies at least one of the following:

a relative magnetic permeability of the first magnetic isolation member is greater than 5.

Optionally, within 0 MHz to 1 MHz, the relative magnetic permeability of the first magnetic isolation member is greater than 5.

With reference to the fifth aspect, in some implementations of the fifth aspect, the SMA motor further includes:

a holder, where the first magnetic isolation member is located in the holder or is attached to a surface of the holder.

According to a sixth aspect, a shape memory alloy SMA motor is provided. The SMA motor is used in a photographing apparatus, the photographing apparatus includes a lens array, an image sensor, and an SMA motor driver module, the SMA motor driver module is configured to provide an alternating current power supply for the SMA motor, the SMA motor driver module includes a first electrical connection port and a second electrical connection port, and the SMA motor includes:

an SMA cable, where one end of the SMA cable is configured to be connected to the lens array, the other end of the SMA cable is fixed relative to the photographing apparatus, and the two ends of the SMA cable are electrically connected to the first electrical connection port and the second electrical connection port respectively; and a second magnetic isolation member, where the second magnetic isolation member includes a second magnetic isolation board and at least one second magnetic isolation edge, the second magnetic isolation board is disposed perpendicular to an optical axis of the photographing apparatus, the second magnetic isolation board includes a second through hole, the second through hole is configured to pass through the lens array, light incident to the photographing apparatus is incident to the image sensor by passing through the second through hole, the second magnetic isolation edge is perpendicularly disposed on the second magnetic isolation board, and the second magnetic isolation edge is located on a side that is of the second magnetic isolation board and that is close to the SMA motor.

With reference to the sixth aspect, in some implementations of the sixth aspect, the second through hole is configured to pass through the lens array.

With reference to the sixth aspect, in some implementations of the sixth aspect, the second magnetic isolation member includes:

a second magnetic isolation board, where the second magnetic isolation board is disposed perpendicular to the optical axis of the photographing apparatus, and the second through hole is located on the second magnetic isolation board; and at least one second magnetic isolation edge, where the second magnetic isolation edge is perpendicularly disposed on the second magnetic isolation board and is located on a side that is of the second magnetic isolation board and that is close to the SMA motor, and the second magnetic isolation edge surrounds a periphery of the second through hole.

With reference to the sixth aspect, in some implementations of the sixth aspect, an inner wall of the second magnetic isolation edge is in communication with a hole wall of the second through hole.

With reference to the sixth aspect, in some implementations of the sixth aspect, the at least one second magnetic isolation edge satisfies the following:

the at least one second magnetic isolation edge is symmetrically disposed relative to the second through hole, and the at least one second magnetic isolation edge is distributed at an equal spacing on the periphery of the second through hole.

With reference to the sixth aspect, in some implementations of the sixth aspect, the second magnetic isolation member satisfies at least one of the following:

a thickness of the second magnetic isolation board is greater than or equal to 0.1 mm;

a height of the second magnetic isolation edge is greater than or equal to 0.1 mm; and a relative magnetic permeability of the second magnetic isolation member is greater than 5.

Optionally, within 0 MHz to 1 MHz, the relative magnetic permeability of the second magnetic isolation member is greater than 5.

According to a seventh aspect, an electronic device is provided, including the camera compact module according to any possible implementation of the first aspect to the second aspect.

According to an eighth aspect, an electronic device is provided, including the motor module according to any possible implementation of the third aspect to the fourth aspect.

According to a ninth aspect, an electronic device is provided, including the SMA motor according to any possible implementation of the fifth aspect to the sixth aspect.

DESCRIPTION OF EMBODIMENTS

The following describes technical solutions of this application with reference to accompanying drawings.

Figure 1:
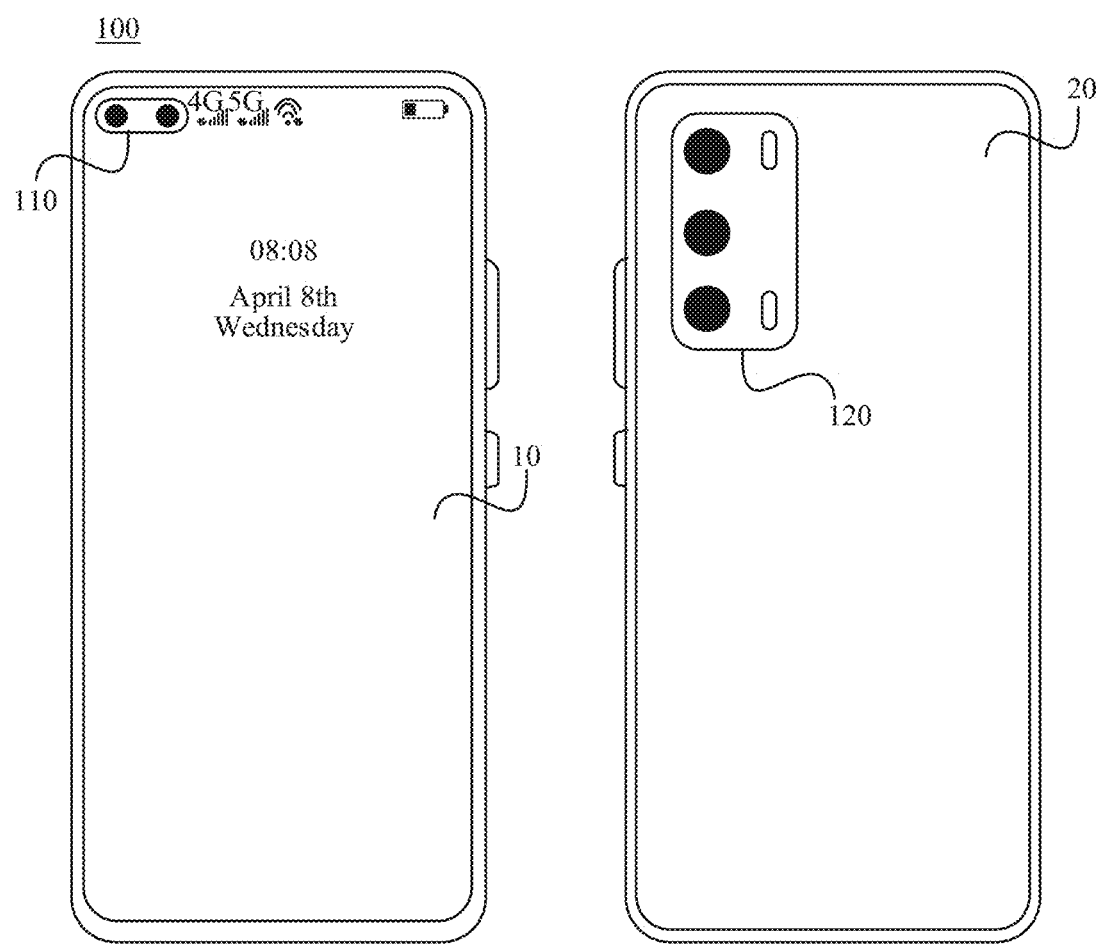
FIG. 1 is a schematic diagram of a structure of an electronic device.

FIG. 1 shows a schematic diagram of a structure of an electronic device 100. The electronic device 100 may be an electronic device with a shooting or photographing function, for example, a mobile phone, a tablet computer, a television (or a smart screen), a laptop computer, a video camera, a video recorder, or a camera. For ease of understanding, an example in which the electronic device 100 is a mobile phone is used for description in embodiments of this application.

The electronic device 100 may include a display screen 10 and a housing. The housing may include a frame and a rear cover 20. The frame may surround a periphery of the display screen 10, and the frame may surround a periphery of the rear cover 20. There may be a specific distance between the display screen 10 and the rear cover 20. The display screen 10 may be disposed in parallel with the rear cover 20.

A front-facing camera compact module (camera compact module, CCM) 110 may be disposed on the display screen 10 of the electronic device 100. As shown in a left figure in FIG. 1, the front-facing camera compact module 110 may be installed at an upper left part of the display screen 10. The front-facing camera compact module 110 may be configured to, for example, take a selfie.

A rear-facing camera compact module 120 may be disposed on the rear cover 20 of the electronic device 100. As shown in a right figure in FIG. 1, the rear-facing camera compact module 120 may be installed at an upper left part of the rear cover 20. The rear-facing camera compact module 120 may be configured to, for example, photograph a scene around the electronic device 100.

It should be understood that installation positions of the front-facing camera compact module 110 and the rear-facing camera compact module 120 shown in FIG. 1 are merely examples, and an installation position of a camera compact module may not be limited in this application. In some other embodiments, the front-facing camera compact module 110 and the rear-facing camera compact module 120 may alternatively be installed at other positions on the electronic device 100. For example, the front-facing camera compact module 110 may be installed at an upper middle part or an upper right part of the display screen 10. For another example, the rear-facing camera compact module 120 may be installed at an upper middle part or an upper right part of the rear cover 20. For another example, the front-facing camera compact module 110 or the rear-facing camera compact module 120 may be disposed on a movable part in the electronic device 100. By moving the movable part, the movable part may be hidden inside the electronic device 100, or may extend out of the electronic device 100.

It should be understood that installation quantities of the front-facing camera compact modules 110 and the rear-facing camera compact modules 120 shown in FIG. 1 are merely examples, and an installation quantity of camera compact modules may not be limited in this application. The electronic device 100 may include more or fewer camera compact modules.

Figure 2:
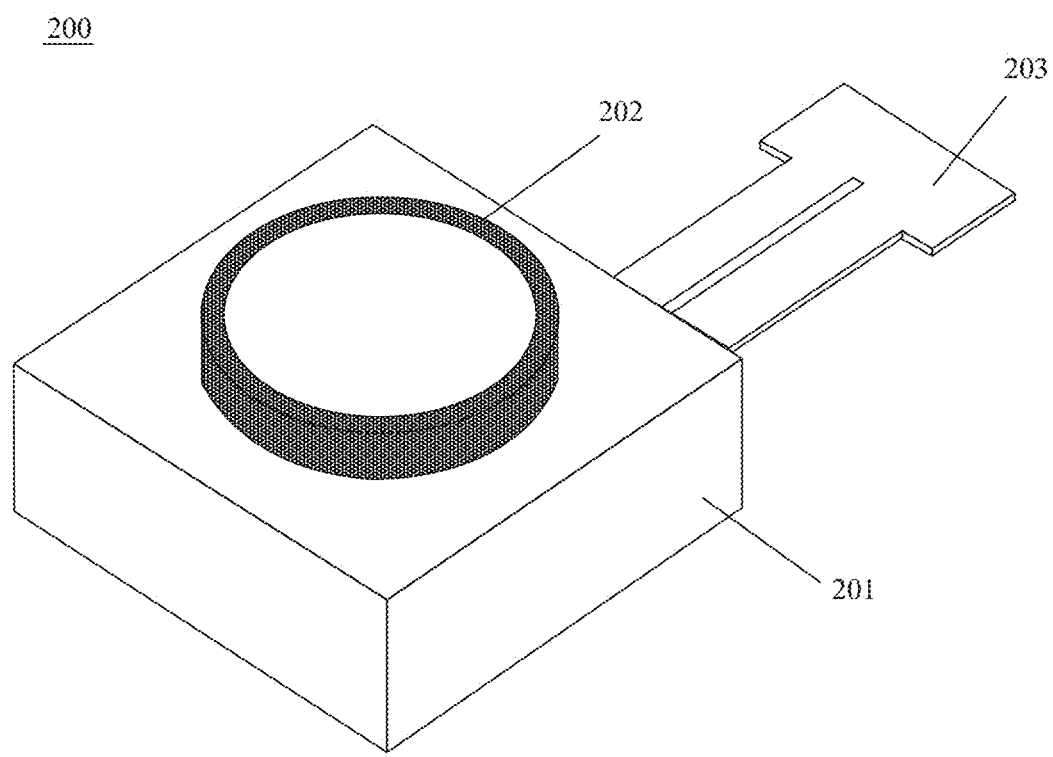
FIG. 2 is a schematic diagram of a structure of a camera compact module.
Figure 3:
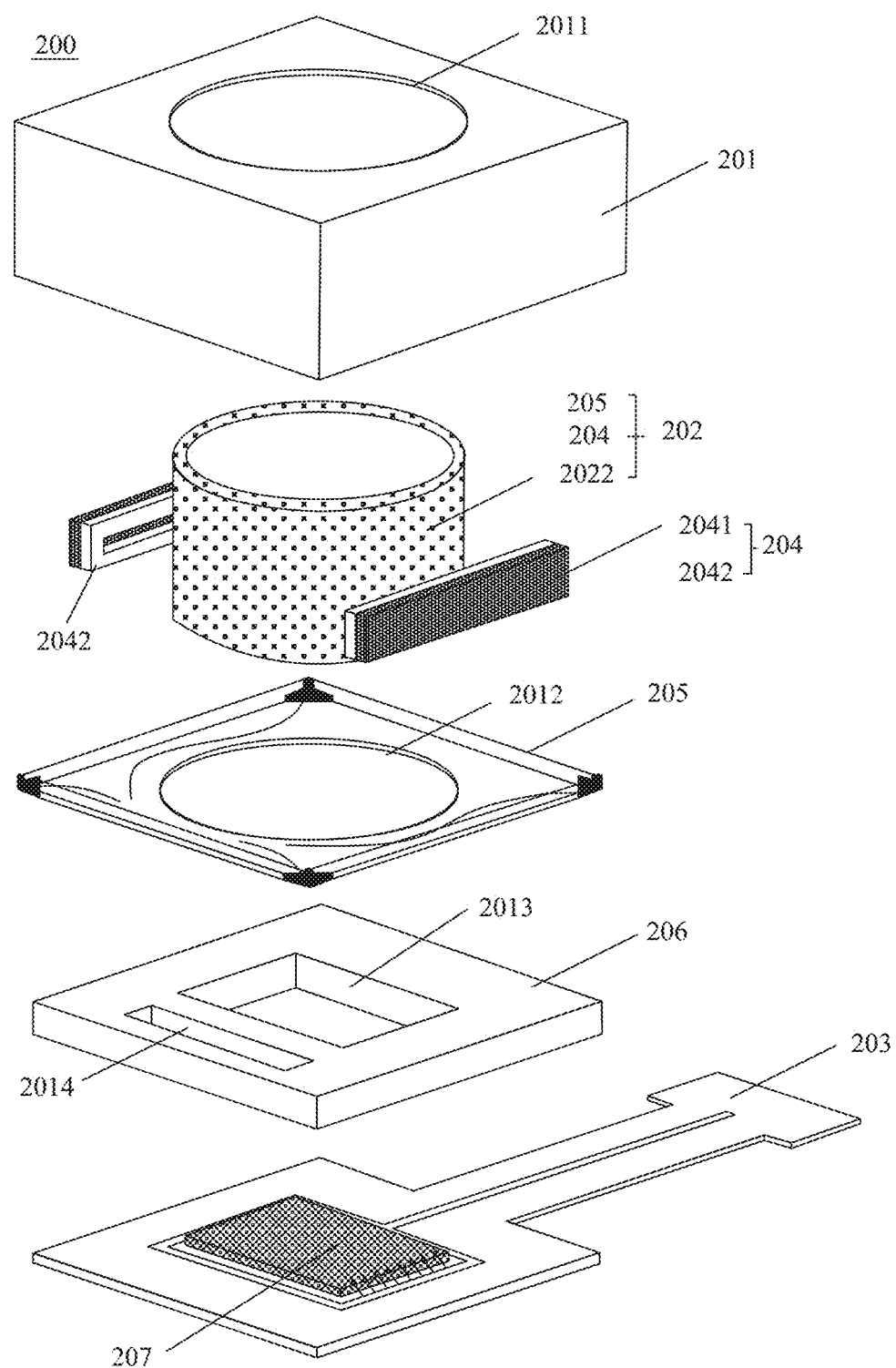
FIG. 3 is an exploded view of a camera compact module.

FIG. 2 is a schematic diagram of a structure of a camera compact module 200 according to an embodiment of this application. FIG. 3 is an exploded view of the camera compact module 200 shown in FIG. 2. The camera compact module 200 may be, for example, the front-facing camera compact module 110 or the rear-facing camera compact module 120 shown in FIG. 1. With reference to FIG. 2 and FIG. 3, it can be learned that the camera compact module 200 may include a camera housing 201, a motor module 202 (in some cases, the motor module may also be referred to as a lens), a circuit board 203, an image sensor 207, and a holder 206. In an example, the motor module 202 may include a lens array 2022, a voice coil motor (voice coil motor, VCM) 204, a shape memory alloy (shape memory alloy, SMA) motor 205, and a lens tube (not shown in FIG. 2) configured to accommodate the lens array 2022, the voice coil motor 204, and the SMA motor 205.

The camera housing 201 may accommodate the voice coil motor 204, the SMA motor 205, the holder 206, the image sensor 207, and the like in the camera compact module 200. Both the lens array 2022 and the circuit board 203 may be partially located in the camera housing 201. The camera housing 201 may further include a through hole 2011 for disposing the lens array 2022.

The circuit board 203 may include a driver module (not shown in FIG. 2). The driver module may supply power to various electronic components (such as the voice coil motor 204, the SMA motor 205, and the image sensor 207) in the camera compact module 200. The driver module may include, for example, an SMA motor driver module (the SMA motor driver module is used as an example below for description). In addition, the circuit board 203 may further transmit a signal from an electronic component in the camera compact module 200 to the outside of the camera compact module 200. The image sensor 207 may be disposed on the circuit board 203. A center of the image sensor 207 may be aligned with an optical axis of the lens array 2022.

The lens array 2022 may pass through the through hole 2011 on the camera housing 201 and extend out of the camera housing 201. The lens array 2022 may project light of a periphery of the camera housing 201 onto the image sensor 207. In addition, the lens array 2022 may further move or rotate in the through hole 2011, to implement functions such as auto focus (auto focus) and optical image stabilization (optical image stabilization, OIS).

The auto focus may mean that, by using a lens imaging principle and an optical reflection principle, light reflected by a photographed object may be imaged on the image sensor 207 after passing through the lens array 2022; and a clear image may be formed on the image sensor 207 by moving one or more lenses in the lens array 2022 based on an object distance of the photographed object. The auto focus may be simply considered as a movement of the lens array 2022 or the lens in an optical axis direction.

The optical image stabilization may mean that, by adjusting a placement angle, a placement position, or the like of the lens array 2022, a phenomenon of instrument jitter occurring in a process of capturing an optical signal can be reduced, and imaging quality can be improved. In a possible method, a to-be-compensated displacement or angle is detected by using, for example, a gyroscope, and then the lens array 2022 is driven by using a motor to perform translation or rotation, so that an image blur caused by imaging instrument device jitter during exposure may be compensated. The optical image stabilization may be simply considered as translation or rotation of the lens array 2022 on a plane perpendicular to the optical axis.

The voice coil motor 204 may be configured to perform the auto focus function. As shown in FIG. 3, the voice coil motor 204 may include a magnet 2041 and a coil 2042 that are disposed around the lens array 2022. The magnet 2041 may be fixed in the camera housing 201 and be still relative to the camera housing 201, and the coil 2042 may be fixed on the lens array 2022. The circuit board 203 may supply power to the coil 2042. The powered coil 2042 may generate a magnetic field 1. The magnetic field 1 interacts with a magnetic field 2 generated by the magnet 2041, so that an attractive force or a repulsive force may be generated. Therefore, the coil 2042 may drive the lens array 2022 to move under an action of the attractive force or the repulsive force, to implement the auto focus function.

In some examples, in addition to the auto focus function, the voice coil motor 204 may further implement the optical image stabilization function. However, a user usually expects that a camera can implement a plurality of image photographing scenarios, for example, photographing a distant-view image, and photographing in a close-view scenario by using a wide aperture. Adjusting a quantity and/or shapes of lenses in the lens array 2022 is conducive to implementing an image photographing scenario. Therefore, with pursuit of the plurality of image photographing scenarios, there is a tendency for a load or a size of the lens array 2022 to be gradually increased. When only the voice coil motor 204 is used to implement the auto focus and the optical image stabilization, an insufficient driving force of the voice coil motor 204 is not conducive to photographing a high-quality image, for example, the image may be blurred. If the driving force of the voice coil motor 204 is enhanced, a volume of the voice coil motor 204 needs to be increased, which is not conducive to miniaturization of the camera compact module 200.

Figure 4:
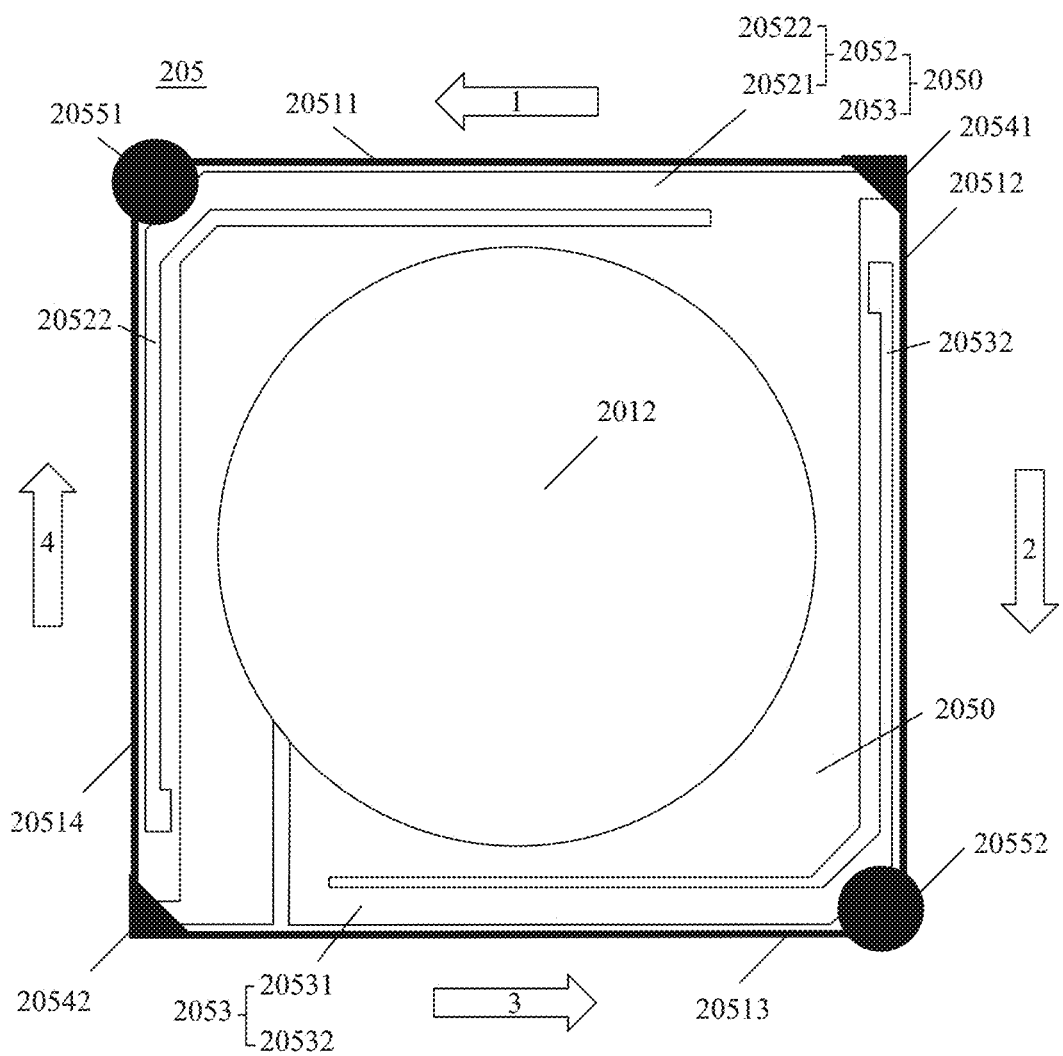
FIG. 4 is a schematic diagram of a structure of an SMA motor.

The camera compact module 200 shown in FIG. 3 further includes the SMA motor 205 configured to implement the auto focus function. In other words, the SMA motor 205 may be configured to supplement a driving force gap of the voice coil motor 204. The SMA motor 205 may be disposed perpendicular to the optical axis of the lens array 2022. The following describes a structure and an operating principle of the SMA motor 205 with reference to FIG. 4.

The SMA motor 205 may include a through hole 2012 corresponding to the lens array 2022 in FIG. 3. In other words, the lens array 2022 may pass through the through hole 2012 on the SMA motor 205. For example, the SMA motor 205 may be fixed on a side of the lens array 2022 close to the image sensor 207.

The SMA motor 205 may further include a rotor end 20541 and a rotor end 20542 that are connected to the lens array 2022, and a stator end 20551 and a stator end 20552 that are fixed relative to the camera housing 201.

The SMA motor 205 may further include an SMA cable 20511, an SMA cable 20512, an SMA cable 20513, and an SMA cable 20514 that are disconnected from each other. The SMA cable 20511 is connected between the rotor end 20541 and the stator end 20551, the SMA cable 20512 is connected between the rotor end 20541 and the stator end 20552, the SMA cable 20513 is connected between the rotor end 20542 and the stator end 20552, and the SMA cable 20514 is connected between the rotor end 20542 and the stator end 20551.

The SMA motor 205 may further include a spring plate 2050, and the spring plate 2050 may be connected to the rotor end 20541 and the rotor end 20542. The spring plate 2050 may further include a spring plate arm 2052 and a spring plate arm 2053. A tail end of the spring plate arm 2052 is close to the rotor end 20541, and an open end of the spring plate arm 2052 extends to the rotor end 20542. The spring plate arm 2052 may include a spring plate arm section 20521 disposed close to the SMA cable 20511 and in parallel with the SMA cable 20511. The spring plate arm 2052 may further include a spring plate arm section 20522 disposed close to the SMA cable 20514 and in parallel with the SMA cable 20514. Similarly, a tail end of the spring plate arm 2053 is close to the rotor end 20542, and an open end of the spring plate arm 2052 extends to the rotor end 20541. The spring plate arm 2053 may include a spring plate arm section 20531 disposed close to the SMA cable 20513 and in parallel with the SMA cable 20513. The spring plate arm 2053 may further include a spring plate arm section 20532 disposed close to the SMA cable 20512 and in parallel with the SMA cable 20512.

The SMA motor driver module may include a first electrical connection port 1 and a second electrical connection port 1 that correspond to the SMA cable 20511, may further include a first electrical connection port 2 and a second electrical connection port 2 that correspond to the SMA cable 20512, may further include a first electrical connection port 3 and a second electrical connection port 3 that correspond to the SMA cable 20513, and may further include a first electrical connection port 4 and a second electrical connection port 4 that correspond to the SMA cable 20514.

Two ends of the SMA cable 20511 may be electrically connected to the first electrical connection port 1 and the second electrical connection port 1 respectively, so that the SMA motor driver module may supply power to the SMA cable 20511. In addition, the SMA cable 20511, the SMA motor driver module, and an electrical connection cable 1 electrically connected between the SMA cable 20511 and the SMA motor driver module may form an electrical connection loop.

Two ends of the SMA cable 20512 may be electrically connected to the first electrical connection port 2 and the second electrical connection port 2 respectively, so that the SMA motor driver module may supply power to the SMA cable 20512. In addition, the SMA cable 20512, the SMA motor driver module, and an electrical connection cable 2 electrically connected between the SMA cable 20512 and the SMA motor driver module may form an electrical connection loop.

Two ends of the SMA cable 20513 may be electrically connected to the first electrical connection port 3 and the second electrical connection port 3 respectively, so that the SMA motor driver module may supply power to the SMA cable 20513. In addition, the SMA cable 20513, the SMA motor driver module, and an electrical connection cable 3 electrically connected between the SMA cable 20513 and the SMA motor driver module may form an electrical connection loop.

Two ends of the SMA cable 20514 may be electrically connected to the first electrical connection port 4 and the second electrical connection port 4 respectively, so that the SMA motor driver module may supply power to the SMA cable 20514. In addition, the SMA cable 20514, the SMA motor driver module, and an electrical connection cable 4 electrically connected between the SMA cable 20514 and the SMA motor driver module may form an electrical connection loop.

When the SMA cable 20511 is powered on, the SMA cable 20511 contracts due to heat, and there is a tendency for the rotor end 20541 to move toward the stator end 20551 (as shown by an arrow 1). Afterward, the spring plate arm section 20521 of the spring plate arm 2052 is squeezed, and may resist continuous contraction of the SMA cable 20511. An interaction force between the SMA cable 20511 and the spring plate arm section 20521 may cause the lens array 2022 to relatively precisely parallel or rotate to a specified position. After the SMA cable 20511 is powered off, the SMA cable 20511 elongates due to cooling, and is restored to an original state under an action of the spring plate arm section 20521.

When the SMA cable 20512 is powered on, the SMA cable 20512 contracts due to heat, and there is a tendency for the rotor end 20541 to move toward the stator end 20552 (as shown by an arrow 2). Afterward, the spring plate arm section 20532 of the spring plate arm 2053 is squeezed, and may resist continuous contraction of the SMA cable 20512. An interaction force between the SMA cable 20512 and the spring plate arm section 20532 may cause the lens array 2022 to relatively precisely parallel or rotate to a specified position. After the SMA cable 20512 is powered off, the SMA cable 20512 elongates due to cooling, and is restored to an original state under an action of the spring plate arm section 20532.

When the SMA cable 20513 is powered on, the SMA cable 20513 contracts due to heat, and there is a tendency for the rotor end 20542 to move toward the stator end 20552 (as shown by an arrow 3). Afterward, the spring plate arm section 20531 of the spring plate arm 2053 is squeezed, and may resist continuous contraction of the SMA cable 20513. An interaction force between the SMA cable 20513 and the spring plate arm section 20531 may cause the lens array 2022 to relatively precisely parallel or rotate to a specified position. After the SMA cable 20513 is powered off, the SMA cable 20513 elongates due to cooling, and is restored to an original state under an action of the spring plate arm section 20531.

When the SMA cable 20514 is powered on, the SMA cable 20514 contracts due to heat, and there is a tendency for the rotor end 20542 to move toward the stator end 20551 (as shown by an arrow 4). Afterward, the spring plate arm section 20522 of the spring plate arm 2052 is squeezed, and may resist continuous contraction of the SMA cable 20514. An interaction force between the SMA cable 20514 and the spring plate arm section 20522 may cause the lens array 2022 to relatively precisely parallel or rotate to a specified position. After the SMA cable 20514 is powered off, the SMA cable 20514 elongates due to cooling, and is restored to an original state under an action of the spring plate arm section 20522.

In an example, a chip (or a processor) that controls the SMA motor 205 may separately control the SMA cable 20511, the SMA cable 20512, the SMA cable 20513, and the SMA cable 20514.

For example, the chip that controls the SMA motor 205 may calculate a to-be-moved position of the lens array 2022, and determine that the SMA cable 20511, the SMA cable 20512, the SMA cable 20513, and the SMA cable 20514 respectively correspond to a contraction amount 1, a contraction amount 2, a contraction amount 3, and a contraction amount 4. Afterward, in a time period 1, the chip may control, based on a current intensity 1 corresponding to the contraction amount 1 of the SMA cable 20511, the circuit board 203 to output a current with the current intensity 1 to the SMA cable 20511 and stop driving the SMA cable 20512, the SMA cable 20513, and the SMA cable 20514. In a time period 2, the chip may control, based on a current intensity 2 corresponding to the contraction amount 2 of the SMA cable 20512, the circuit board 203 to output a current with the current intensity 2 to the SMA cable 20512 and stop driving the SMA cable 20511, the SMA cable 20513, and the SMA cable 20514. In a time period 3, the chip may control, based on a current intensity 3 corresponding to the contraction amount 3 of the SMA cable 20513, the circuit board 203 to output a current with the current intensity 3 to the SMA cable 20513 and stop driving the SMA cable 20512, the SMA cable 20511, and the SMA cable 20514. In a time period 4, the chip may control, based on a current intensity 4 corresponding to the contraction amount 4 of the SMA cable 20514, the circuit board 203 to output a current with the current intensity 4 to the SMA cable 20514 and stop driving the SMA cable 20512, the SMA cable 20513, and the SMA cable 20511.

In conclusion, the SMA motor 205 is powered on, so that the SMA motor 205 having a feature of contraction caused by heat and expansion caused by cold may be deformed, so that the lens array 2022 may be driven to translate and rotate relative to the camera housing 201, to implement the optical image stabilization function.

In an example, before the camera compact module 200 prepares to photograph an image, the circuit board 203 may supply power to the voice coil motor 204, to drive the voice coil motor 204 to perform auto focus. The circuit board 203 may further supply power to the SMA motor 205, to drive the SMA motor 205 to perform optical image stabilization. It should be understood that, in another example, the voice coil motor 204 and the SMA motor 205 in the camera compact module 200 may mutually or jointly implement the optical image stabilization function.

With reference to FIG. 3, it can be learned that the SMA motor 205 may be disposed on the holder 206 in the camera compact module 200. The holder 206 may be, for example, fixed on the circuit board 203. In other words, the holder 206 may be located between the image sensor 207 and the SMA motor 205. This is conducive to preventing the SMA motor 205 from being too close to the image sensor 207, and reducing magnetic field impact of the SMA motor 205 on the image sensor 207.

The holder 206 may include a through hole 2013 corresponding to the image sensor 207, and a projection region of the holder 206 on the circuit board 203 may include a projection region of the image sensor 207 on the circuit board 203. In this way, light from the lens array 2022 may reach the image sensor 207 through the through hole 2013 on the holder 206.

The holder 206 may further include a through hole 2014. The through hole 2014 and a pin (or a signal input port) of the SMA motor 205 are located on a same side of the camera compact module 200. The circuit board 203 may drive or feed the SMA motor 205 by using an electrical connection cable that is from the circuit board 203, passes through the through hole 2014, and is connected to the pin of the SMA motor 205.

The circuit board 203 may provide a low-frequency alternating current signal (for example, a pulse width modulation (pulse width modulation, PWM) signal) for the SMA motor 205, to reduce power consumption of the SMA motor 205 and reduce resonance abnormal sound of the SMA motor 205, thereby being conducive to avoiding overheating of the SMA motor 205. Due to such a power supply loop of the SMA motor to which the low-frequency alternating current signal is added, the SMA motor 205 may generate an interference magnetic field, which affects normal working of a magnetic sensitive component (for example, the image sensor 207 or a power supply of the image sensor 207) in the camera compact module 200.

In an example, the holder 206 may use a soft magnetic material having a high magnetic permeability, for example, a low-carbon steel, a ferro-silicon alloy, a ferro-aluminum alloy, a ferro-silicon aluminum alloy, a nickel-ironium alloy, a ferrocobalt alloy, a soft magnetic ferrite, an amorphous soft magnetic alloy, or a super-microcrystalline soft magnetic alloy. However, this can only mitigate a magnetic field interference situation generated by the SMA motor 205 to a limited extent (for example, only 10% to 20% of interference magnetic field intensity is reduced). If the SMA motor 205 uses a high-frequency alternating current to supply power, a magnetic isolation effect that can be implemented by the holder 206 using the soft magnetic material is more limited. In addition, because a distance between the holder 206 and the image sensor 207 is very close, the holder 206 may be affected by the SMA motor 205 to induce a new magnetic field, and intensity of the new magnetic field may be larger. This is less conducive to reducing magnetic field interference to the image sensor 207.

Figure 5:
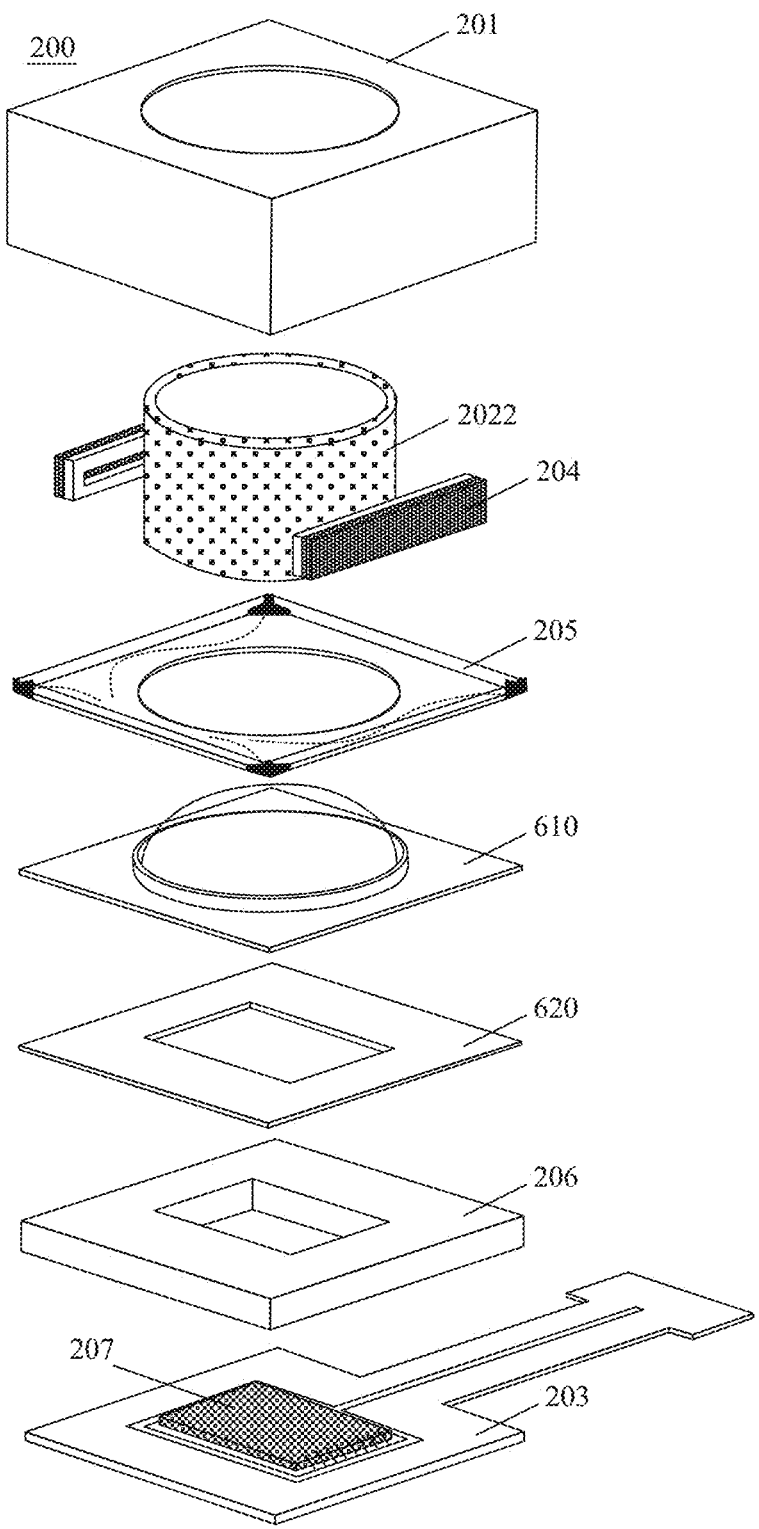
FIG. 5 is an exploded view of a camera compact module according to an embodiment of this application.

FIG. 5 shows a camera compact module 200 according to an embodiment of this application.

Similar to the camera compact module 200 shown in FIG. 2, the camera compact module 200 shown in FIG. 5 may include a camera housing 201, a lens array 2022, a circuit board 203, a voice coil motor 204, an SMA motor 205, a holder 206, and an image sensor 207. In addition, the camera compact module 200 shown in FIG. 5 may further include a first magnetic isolation member 620 and a second magnetic isolation member 610 that are disposed between the SMA motor 205 and the holder 206. The first magnetic isolation member 620 may be closer to the image sensor 207 than the second magnetic isolation member 610, and the second magnetic isolation member 610 may be closer to the lens array 2022 than the first magnetic isolation member 620.

For example, in an example shown in FIG. 5, the first magnetic isolation member 620 may be located between the second magnetic isolation member 610 and the holder 206.

For another example, the holder 206 may be located between the first magnetic isolation member 620 and the second magnetic isolation member 610.

For another example, the first magnetic isolation member 620 may be located in the holder 206, and the second magnetic isolation member 610 may be located on a side of the holder 206 close to the SMA motor 205.

Figure 6:
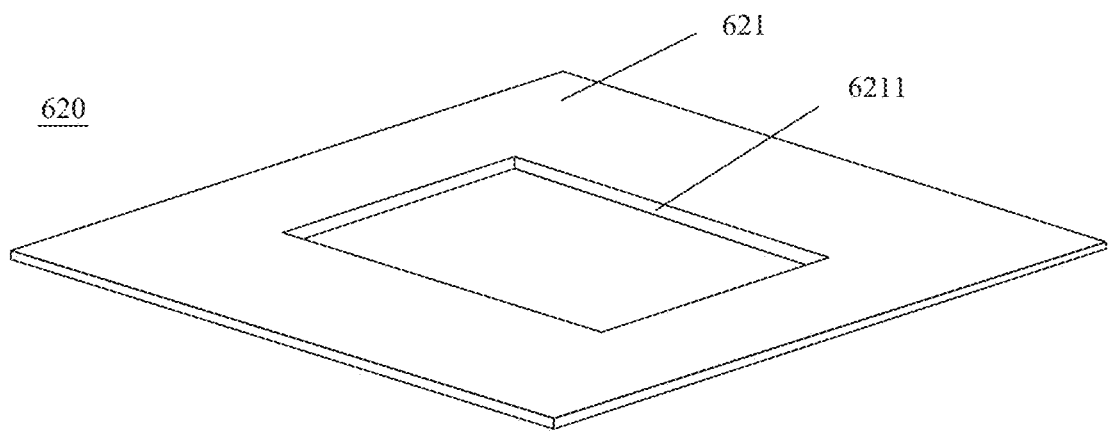
FIG. 6 is a schematic diagram of a structure of a second magnetic isolation member according to an embodiment of this application.

FIG. 6 shows a schematic diagram of a structure of a first magnetic isolation member 620 according to an embodiment of this application.

With reference to FIG. 5 and FIG. 6, the first magnetic isolation member 620 may include a first magnetic isolation board 621 disposed in parallel with the image sensor 207. The first magnetic isolation board 621 may also be understood as being disposed perpendicular to an optical axis of the lens array 2022. An outer contour of the first magnetic isolation board 621 may be, for example, a rectangle, a circle, or a polygon. This may not be limited in this application.

With reference to FIG. 5 and FIG. 6, the first magnetic isolation board 621 may include a first through hole 6211. With reference to FIG. 5 and FIG. 6, after passing through the second magnetic isolation member 610, light incident to the camera compact module 200 may pass through the first through hole 6211, and the light emitted from the first through hole 6211 may be projected onto the image sensor 207. A hole wall shape of the first through hole 6211 may correspond to a shape of the image sensor 207. In other words, a third projection region of a hole wall of the first through hole 6211 on the circuit board 203 corresponds to a fourth projection region of the image sensor 207 on the circuit board 203 (the fourth projection region may be located in the third projection region, and an area difference between the third projection region and the fourth projection region may be less than a preset area, that is, a maximum distance between an outer contour of the fourth projection region and an outer contour of the third projection region may be less than a preset distance). In this way, the image sensor 207 may not be blocked by the first magnetic isolation board 621, to detect light from the lens array 2022, and be conducive to ensuring a magnetic isolation effect of the first magnetic isolation member 620 on the image sensor 207 (if the hole wall shape of the first through hole 6211 greatly differs from the shape of the image sensor 207, the magnetic isolation effect of the first magnetic isolation member 620 on the image sensor 207 may be reduced). The first through hole 6211 may be, for example, a square hole.

Figure 7:
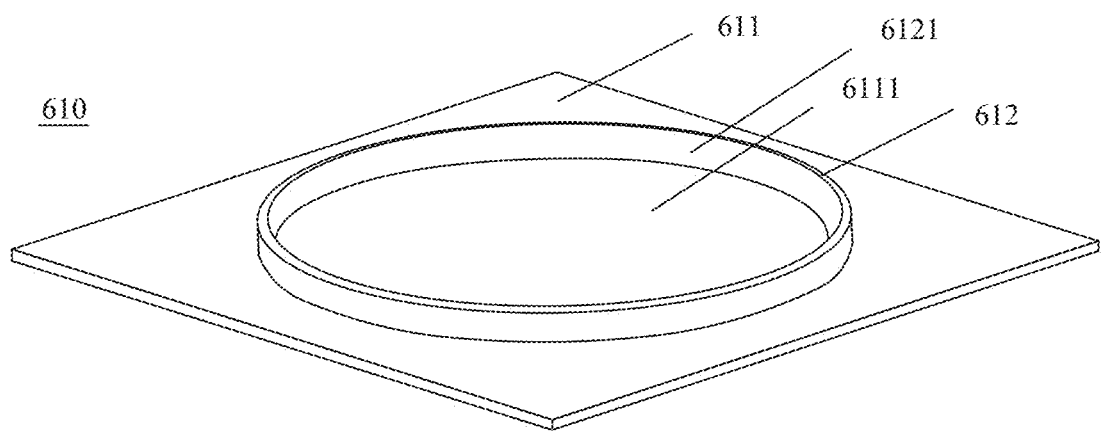
FIG. 7 is a schematic diagram of a structure of a first magnetic isolation member according to an embodiment of this application.

FIG. 7 shows a schematic diagram of a structure of a second magnetic isolation member 610 according to an embodiment of this application.

With reference to FIG. 5 and FIG. 7, the second magnetic isolation member 610 may include a second magnetic isolation board 611 disposed in parallel with the image sensor 207. The second magnetic isolation board 611 may also be understood as being disposed perpendicular to an optical axis of the lens array 2022. An outer contour of the second magnetic isolation board 611 may be, for example, a rectangle, a circle, or a polygon. This may not be limited in this application.

With reference to FIG. 5 and FIG. 7, the second magnetic isolation board 611 may include a second through hole 6111. With reference to FIG. 5 and FIG. 7, after passing through the SMA motor 205, light incident to the camera compact module 200 may pass through the second through hole 6111, and the light emitted from the second through hole 6111 may be projected onto the image sensor 207. A hole wall shape of the second through hole 6111 may correspond to a shape of the lens array 2022. In other words, a first projection region of a hole wall of the second through hole 6111 on the circuit board 203 corresponds to a second projection region of the lens array 2022 on the circuit board 203 (the second projection region may be located in the first projection region, and an area difference between the first projection region and the second projection region may be less than a preset area, that is, a maximum distance between an outer contour of the second projection region and an outer contour of the first projection region may be less than a preset distance). In this way, the lens array 2022 may be assembled in the second through hole 6111, and this is conducive to improving a magnetic isolation effect of the second magnetic isolation member 610 on the image sensor 207 (if the hole wall shape of the second through hole 6111 greatly differs from the shape of the lens array 2022, the magnetic isolation effect of the second magnetic isolation member 610 on the image sensor 207 may be reduced). The second through hole 6111 may be, for example, a round hole.

The second magnetic isolation member 610 may further include a second magnetic isolation edge 612 disposed on the second magnetic isolation board 611, and the second magnetic isolation edge 612 may be disposed perpendicular to the second magnetic isolation board 611. With reference to FIG. 5 and FIG. 7, the second magnetic isolation edge 612 may also be understood as being disposed perpendicular to the image sensor 207, or being disposed in parallel with the optical axis of the lens array 2022. The second magnetic isolation edge 612 may surround a periphery of the second through hole 6111, and is located on a side that is of the second magnetic isolation board 611 and that is away from the image sensor 207. In the examples shown in FIG. 5 and FIG. 7, the second magnetic isolation edge 612 may be annular, and an inner wall (a side wall of the second magnetic isolation edge 612 closest to the optical axis of the lens array 2022) 6121 of the second magnetic isolation edge 612 may be in communication with the hole wall of the second through hole 6111. In another example, a step surface may be disposed between the inner wall 6121 of the second magnetic isolation edge 612 and the hole wall of the second through hole 6111. For example, the step surface may be disposed in parallel with the second magnetic isolation board 611.

Both the first magnetic isolation member 620 and the second magnetic isolation member 610 may use soft magnetic materials.

Optionally, a relative magnetic permeability (the relative magnetic permeability may be a ratio of a magnetic permeability of a special medium to a vacuum magnetic permeability, where the magnetic permeability may reflect a magnetization degree of a material under an action of an external magnetic field) of the first magnetic isolation member 620 may be greater than a first preset relative magnetic permeability, and a value of the first preset relative magnetic permeability may be, for example, 5, 10, or 10. For example, the relative magnetic permeability of the first magnetic isolation member 620 is 70.

In addition, in different frequency bands, a relative magnetic permeability of the soft magnetic material may be different. Optionally, the relative magnetic permeability of the first magnetic isolation member 620 may be greater than 5 within 0 MHz to 1 MHz.

Similarly and optionally, the relative magnetic permeability of the second magnetic isolation member 610 may be greater than a second preset relative magnetic permeability, and a value of the second preset relative magnetic permeability may be, for example, 5, 10, or 100. For example, the relative magnetic permeability of the second magnetic isolation member 610 is 70. Similarly and optionally, the relative magnetic permeability of the second magnetic isolation member 610 may be greater than 5 within 0 MHz to 1 MHz.

Figure 8:
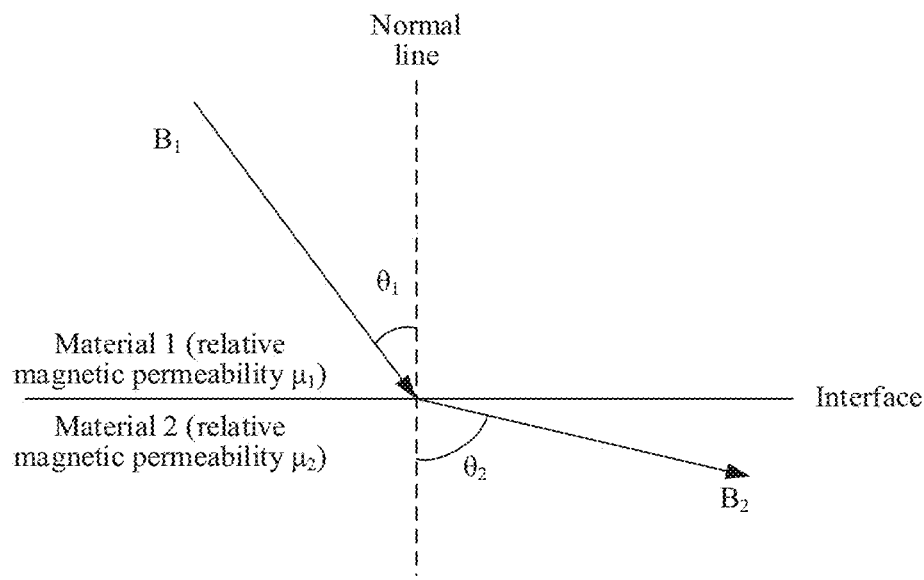
FIG. 8 is a schematic diagram of a magnetic isolation principle of a soft magnetic material.
Figure 9:
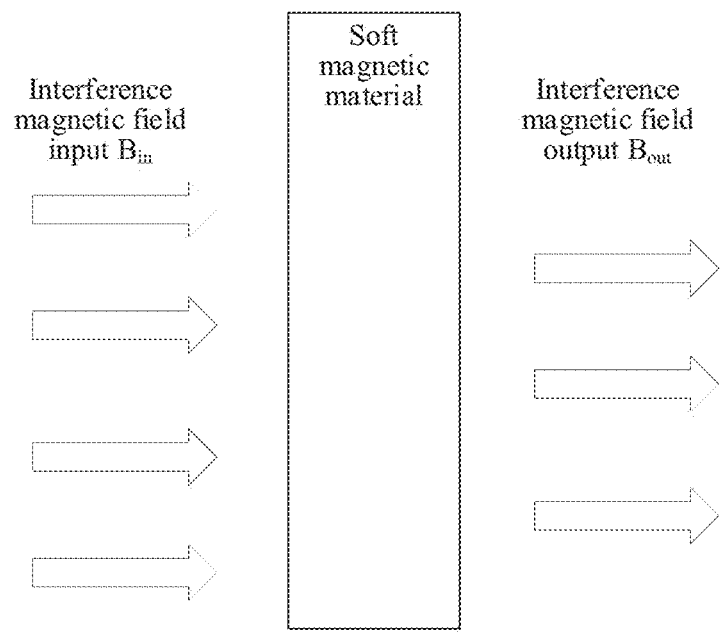
FIG. 9 is a schematic diagram of a magnetic isolation principle of a soft magnetic material.
Figure 10:
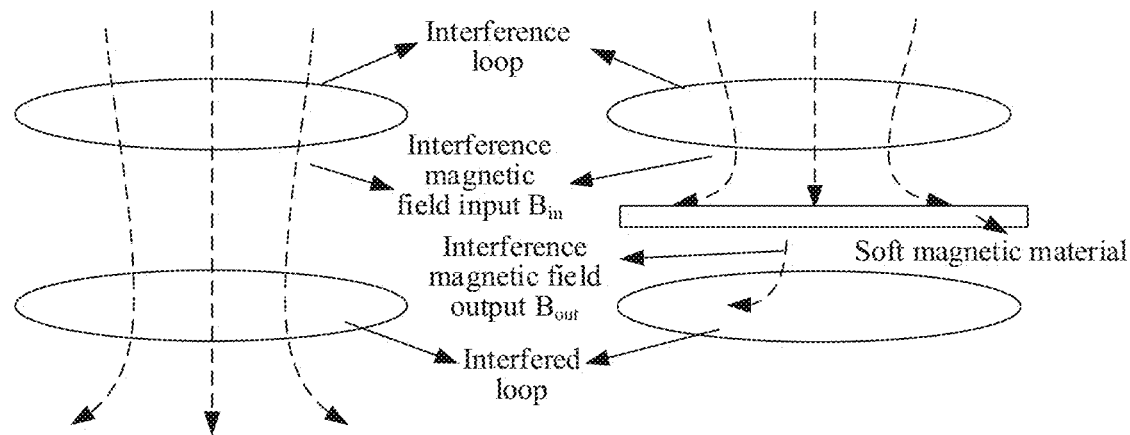
FIG. 10 is a schematic diagram of a magnetic isolation principle of a soft magnetic material.

With reference to FIG. 8 to FIG. 10, the following describes a magnetic isolation principle of the soft magnetic material.

FIG. 8 shows a direction deflection principle of a magnetic field when the magnetic field enters a material 2 from a material 1. A magnetic field $B_1$ in the material 1 may reach, along a direction 1, an interface between the material 1 and the material 2, and an included angle between the direction 1 and a normal line perpendicular to the interface is $\theta_1$. A magnetic field $B_2$ entering the material 2 may continue to propagate along a direction 2 from the interface between the material 1 and the material 2, and an included angle between the direction 2 and the normal line perpendicular to the interface is $\theta_2$. A relative magnetic permeability of the material 1 is $\mu_1$, and a relative magnetic permeability of the material 1 is $\mu_2$. When $\mu_2 > \mu_1$, $\theta_2 > \theta_1$. When $\mu_2$ is far greater than $\mu_1$, $\theta_2$ is close to 90°, and a direction of $B_2$ is approximately tangent to the interface.

According to a relationship between an interface deflection angle and a relative magnetic permeability of a material, after an interference magnetic field enters a soft magnetic material medium from another medium, a direction may be deflected. Therefore, a magnetic field component propagated along the normal line is smaller.

In addition, a changing magnetic field generates an eddy current effect when passing through the soft magnetic material, and some energy of the interference magnetic field may be converted into thermal energy and dissipated. An amount of magnetic field energy that can be converted into thermal energy is usually related to an electrical conductivity of the soft magnetic material.

In addition, a magnetic domain direction of the soft magnetic material may change under an action of the changing magnetic field. Continuously changing magnetic domains may interact with each other, thereby causing the material to emit heat. An ability to change the magnetic domain direction is usually related to residual magnetic flux, coercivity, and other parameters of the soft magnetic material.

In conclusion, as shown in FIG. 9, the soft magnetic material may weaken intensity of the interference magnetic field that passes through, that is, in FIG. 9, $B_{in}$ may be greater than $B_{out}$. As shown in FIG. 10, a soft magnetic material is disposed between an interference loop and an interfered loop, thereby being conducive to reducing intensity of a magnetic field entering the interfered loop.

Because both the first magnetic isolation member 620 and the second magnetic isolation member 610 use soft magnetic materials, after the interference magnetic field from the SMA motor passes through the second magnetic isolation member 610 and the first magnetic isolation member 620, a magnetic field component that continues to propagate to the image sensor 207 is very small. In addition, the SMA motor may generate a changing magnetic field. When the changing magnetic field passes through the second magnetic isolation member 610 or the first magnetic isolation member 620, an eddy current effect is generated. In addition, the changing magnetic field may change a magnetic domain direction of the second magnetic isolation member 610 or the first magnetic isolation member 620, so that some energy of the interference magnetic field may be converted into thermal energy and dissipated. Therefore, both the first magnetic isolation member 620 and the second magnetic isolation member 610 use the soft magnetic material, thereby being conducive to reducing magnetic field interference to the image sensor 207 or a power supply of the image sensor 207.

Figure 11:
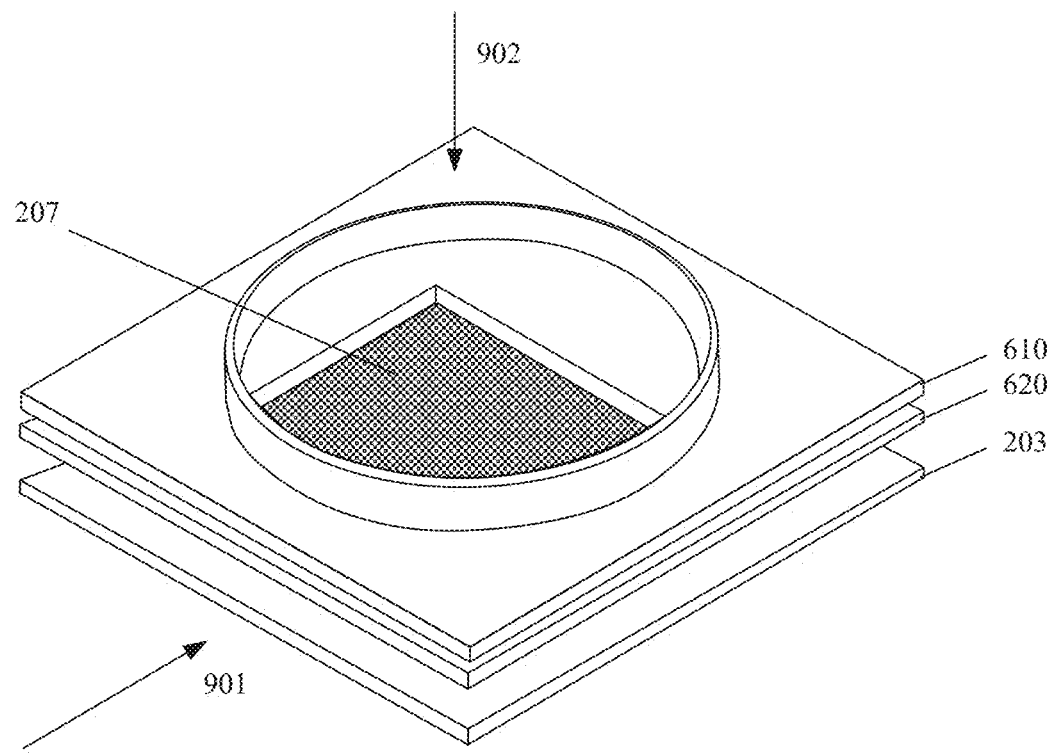
FIG. 11 is a schematic diagram of a three-dimensional structure of a first magnetic isolation member, a second magnetic isolation member, and a circuit board according to an embodiment of this application.
Figure 12:
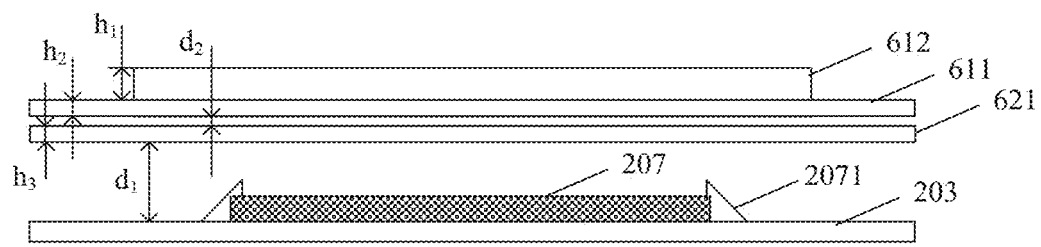
FIG. 12 is a schematic diagram of a structure of a first magnetic isolation member, a second magnetic isolation member, and a circuit board at a first angle of view according to an embodiment of this application.
Figure 13:
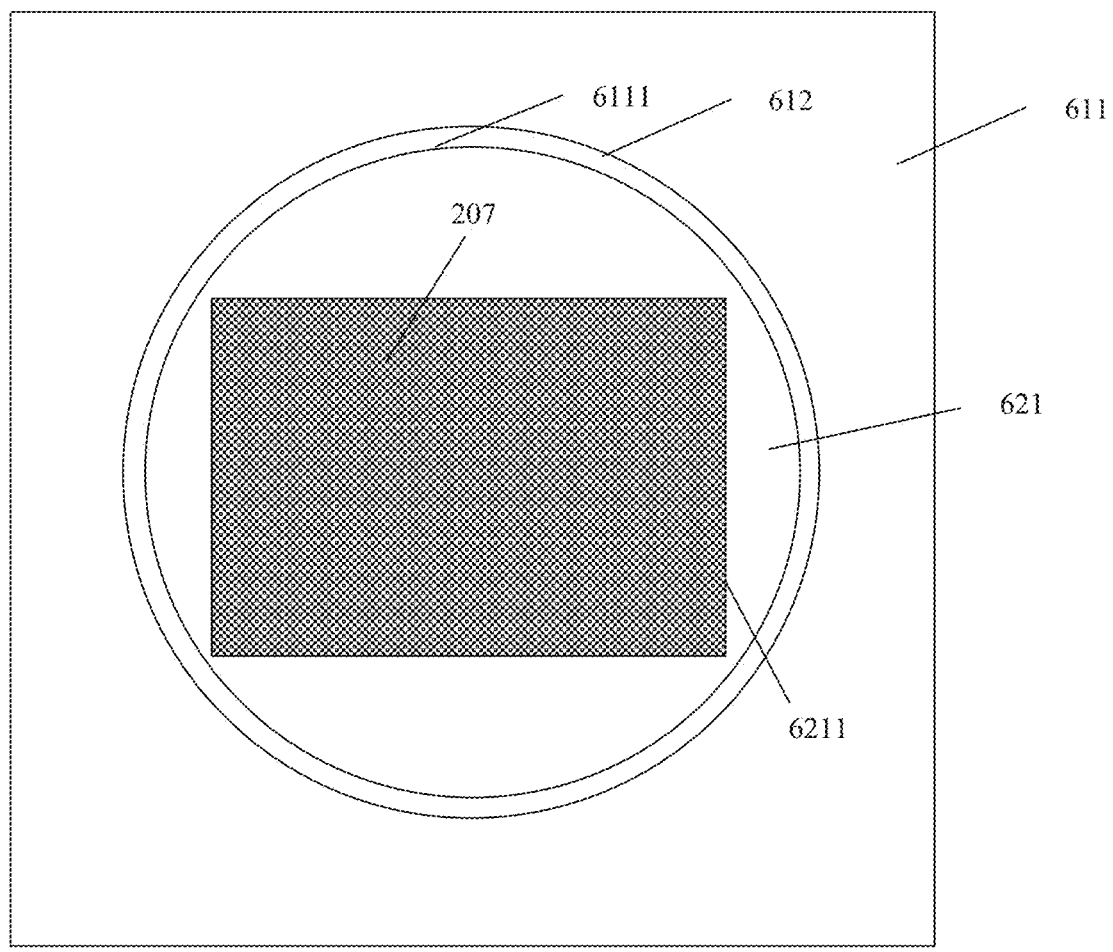
FIG. 13 is a schematic diagram of a structure of a first magnetic isolation member, a second magnetic isolation member, and a circuit board at a second angle of view according to an embodiment of this application.

FIG. 11 to FIG. 13 show a position relationship among a first magnetic isolation member 620, a second magnetic isolation member 610, and a circuit board 203 (it should be understood that, compared with the circuit board 203 shown in FIG. 2 to FIG. 5, FIG. 11 to FIG. 13 simply express a shape of the circuit board 203) according to this application. An image sensor 207 is disposed on the circuit board 203. FIG. 11 shows a schematic diagram of a three-dimensional structure of the first magnetic isolation member 620, the second magnetic isolation member 610, and the circuit board 203. FIG. 12 shows a schematic diagram of a structure of the first magnetic isolation member 620, the second magnetic isolation member 610, and the circuit board 203 at a first angle of view. The first angle of view may be an observation angle of view (that is, an observation angle of view perpendicular to an optical axis) shown by an arrow 901 in FIG. 11. FIG. 13 shows a schematic diagram of a structure of the first magnetic isolation member 620, the second magnetic isolation member 610, and the circuit board 203 at a second angle of view. The second angle of view may be an observation angle of view (that is, an observation angle of view parallel to the optical axis) shown by an arrow 902 in FIG. 11.

Optionally, a height $h_1$ of a second magnetic isolation edge 612 may be greater than or equal to 0.1 mm.

For example, the height $h_1$ of the second magnetic isolation edge 612 may be 0.2 mm.

Optionally, a thickness $h_2$ of a second magnetic isolation board 611 may be greater than or equal to 0.1 mm.

For example, the thickness $h_2$ of the second magnetic isolation board 611 may be 0.15 mm.

Optionally, the thickness $h_2$ of the second magnetic isolation board 611 may be greater than or equal to 0.2 mm.

With reference to FIG. 5 and FIG. 12, it can be learned that a total thickness (for example, $h_1+h_2$) of the second magnetic isolation member may be determined based on a position of the SMA motor 205 relative to the lens array 2022. For example, a distance between an end of the lens array 2022 close to the image sensor and the SMA motor 205 is $s_1$, and $h_1+h_2 < s_1$. In addition, the second magnetic isolation member should not affect auto focus and optical image stabilization of the lens array 2022.

Optionally, a thickness $h_3$ of the first magnetic isolation board 621 may be greater than or equal to 0.1 mm.

For example, the thickness $h_3$ of the first magnetic isolation board 621 may be 0.15 mm.

Optionally, the thickness $h_3$ of the first magnetic isolation board 621 may be greater than or equal to 0.2 mm.

It should be noted that, if the first magnetic isolation board 621 is formed on the holder 206 in an electroplating manner, the thickness $h_3$ of the first magnetic isolation board 621 may be smaller. For example, the thickness $h_3$ of the first magnetic isolation board 621 may be within 0.005 mm to 0.05 mm. For another example, the thickness $h_3$ of the first magnetic isolation board 621 may be 0.01 mm.

Optionally, a distance between the first magnetic isolation board 621 and the circuit board 203 may be greater than or equal to 0.1 mm.

For example, the distance between the first magnetic isolation board 621 and the circuit board 203 may be 0.8 mm.

Optionally, a distance $d_1$ between the first magnetic isolation board 621 and the image sensor 207 may be greater than or equal to 0.1 mm.

For example, the distance $d_1$ between the first magnetic isolation board 621 and the image sensor 207 may be 0.8 mm.

Optionally, a distance $d_2$ (for example, a minimum distance or an average distance) between the second magnetic isolation board 611 and the first magnetic isolation board 621 may be greater than or equal to 0.1 mm.

For example, the distance $d_2$ between the second magnetic isolation board 611 and the first magnetic isolation board 621 may be 0.15 mm.

In an example, the second magnetic isolation board 611 and the first magnetic isolation board 621 may be separately attached to two sides of the holder 206 shown in FIG. 5, and the distance between the second magnetic isolation board 611 and the first magnetic isolation board 621 may be equal to a thickness of the holder 206.

In addition, with reference to FIG. 11 to FIG. 13, it can be learned that a projection region (that is, the third projection region described above) of the first through hole 6211 of the first magnetic isolation member 620 on the circuit board 203 may approximately entirely overlap a projection region (that is, the fourth projection region described above) of the image sensor 207 on the circuit board 203. In other words, a maximum distance between a first outer contour of the third projection region and a second outer contour of the fourth projection region may be approximately equal to zero.

In a possible scenario, a light sensitive region of the image sensor 207 may be a partial region of the image sensor 207. In this case, even if the third projection region entirely overlaps the fourth projection region, the first magnetic isolation member 620 may not block the light sensitive region of the image sensor 207. In addition, the first magnetic isolation member 620 may have a larger magnetic isolation area (that is, it is more conducive to blocking magnetic field interference of the SMA motor to the pin of the image sensor 207), thereby being conducive to reducing magnetic field interference to the image sensor 207 or the power supply of the image sensor 207.

Similarly, when the optical image stabilization function of the lens array 2022 is ensured, a maximum distance between an outer contour of a projection region (that is, the first projection region described above) of the second through hole 6111 of the second magnetic isolation board 611 on the circuit board 203 and an outer contour of a projection region (that is, the second projection region described above) of the lens array 2022 on the circuit board 203 may be smaller, to obtain a large magnetic isolation area as much as possible.

Figure 14:
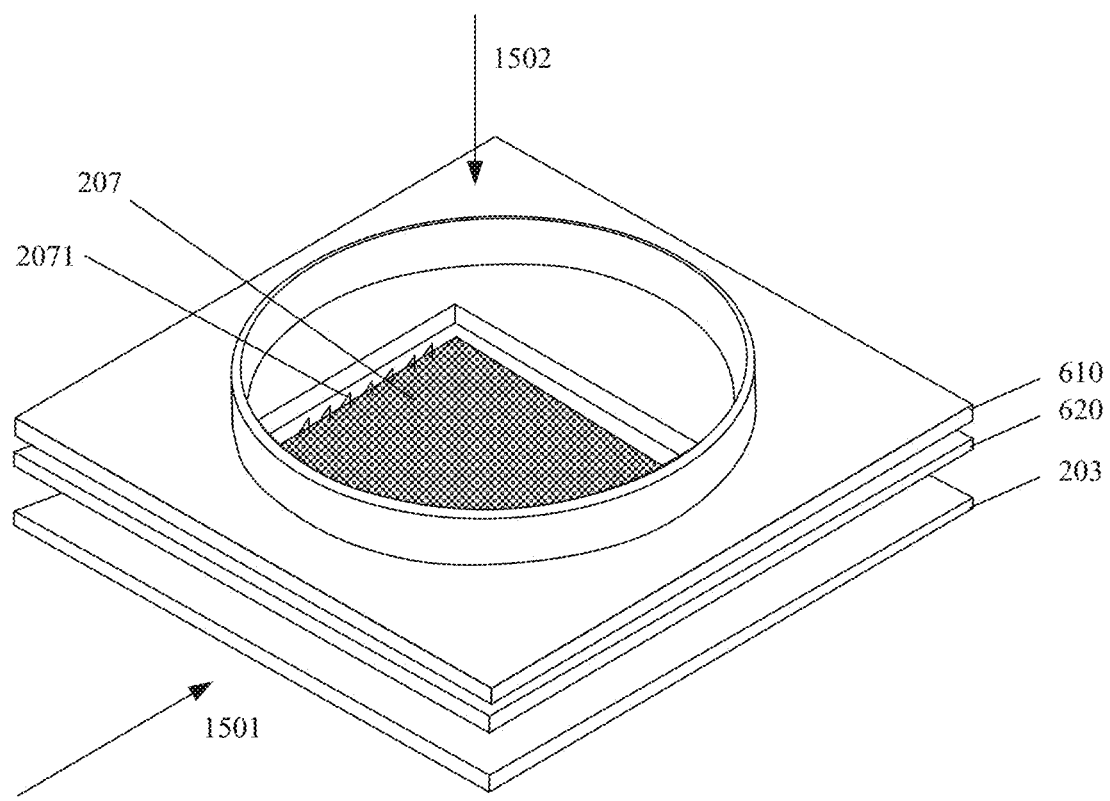
FIG. 14 is a schematic diagram of a three-dimensional structure of a first magnetic isolation member, a second magnetic isolation member, and a circuit board according to an embodiment of this application.
Figure 15:
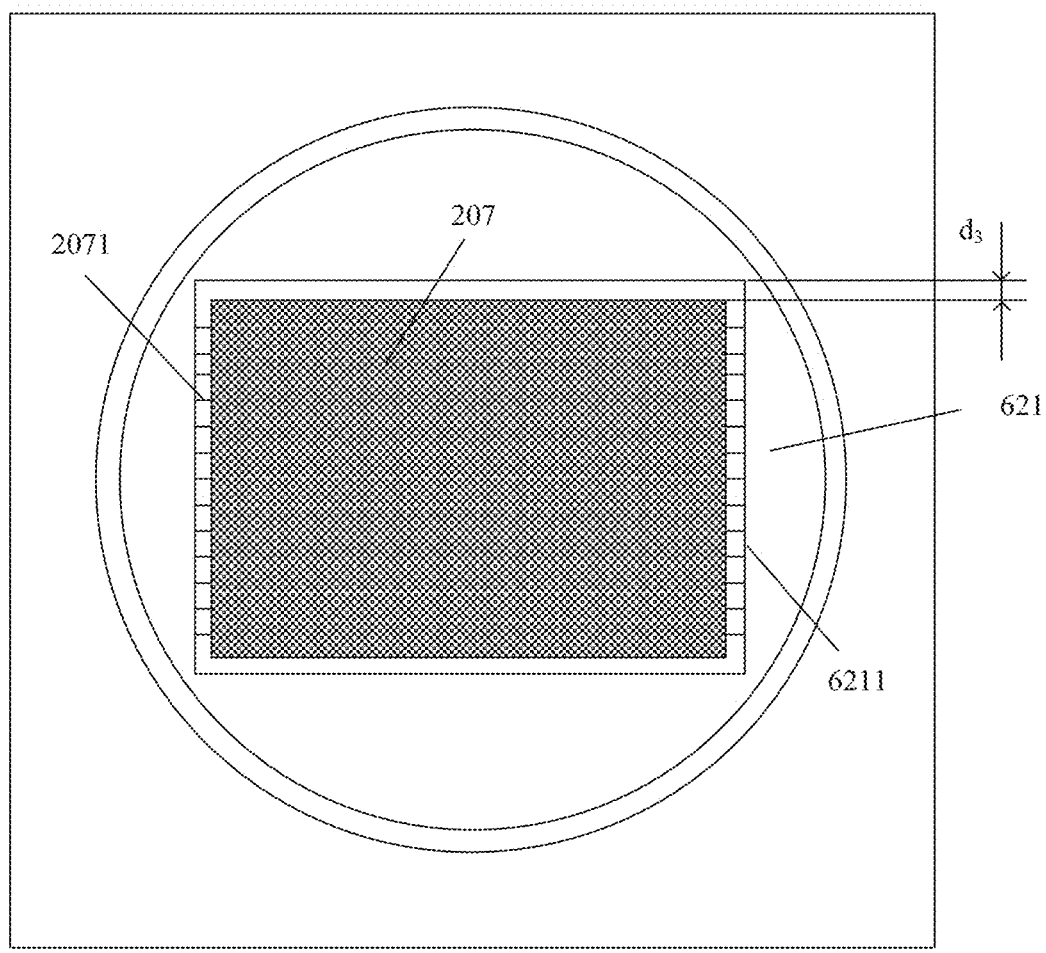
FIG. 15 is a schematic diagram of a structure of a first magnetic isolation member, a second magnetic isolation member, and a circuit board at a second angle of view according to an embodiment of this application.

FIG. 14 and FIG. 15 show another position relationship among a first magnetic isolation member 620, a second magnetic isolation member 610, and a circuit board 203 according to this application. An image sensor 207 is disposed on the circuit board 203. FIG. 14 shows a schematic diagram of a three-dimensional structure of the first magnetic isolation member 620, the second magnetic isolation member 610, and the circuit board 203. FIG. 15 shows a schematic diagram of a structure of the first magnetic isolation member 620, the second magnetic isolation member 610, and the circuit board 203 at a first angle of view. The first angle of view may be an observation angle of view (that is, an observation angle of view perpendicular to an optical axis) shown by an arrow 1501 in FIG. 14. For a schematic diagram of a structure of the first magnetic isolation member 620, the second magnetic isolation member 610, and the circuit board 203 at a second angle of view, refer to the embodiment shown in FIG. 12. The second angle of view may be an observation angle of view (that is, an observation angle of view parallel to the optical axis) shown by an arrow 1501 in FIG. 14.

Different from the examples shown in FIG. 11 and FIG. 13, in FIG. 14 and FIG. 15, a projection region (that is, the third projection region described above) of the first through hole 6211 of the first magnetic isolation member 620 on the circuit board 203 may not entirely overlap a projection region (that is, the fourth projection region described above) of the image sensor 207 on the circuit board 203, and the fourth projection region may be located in the third projection region. As shown in FIG. 15, a projection region of a pin 2071 of the image sensor 207 on the circuit board 203 may be located in the third projection region. In other words, a maximum value of a distance d3 between a first outer contour of the third projection region and a second outer contour of the fourth projection region may be greater than zero. This is conducive to preventing the first magnetic isolation member 620 from blocking light incident to the image sensor 207. However, to improve a magnetic isolation effect of the first magnetic isolation member 620, optionally, the maximum distance between the first outer contour of the third projection region and the second outer contour of the fourth projection region may be less than or equal to 1.5 mm. For example, an average distance between the first outer contour of the third projection region and the second outer contour of the fourth projection region may be 0.2 mm.

Figure 16:
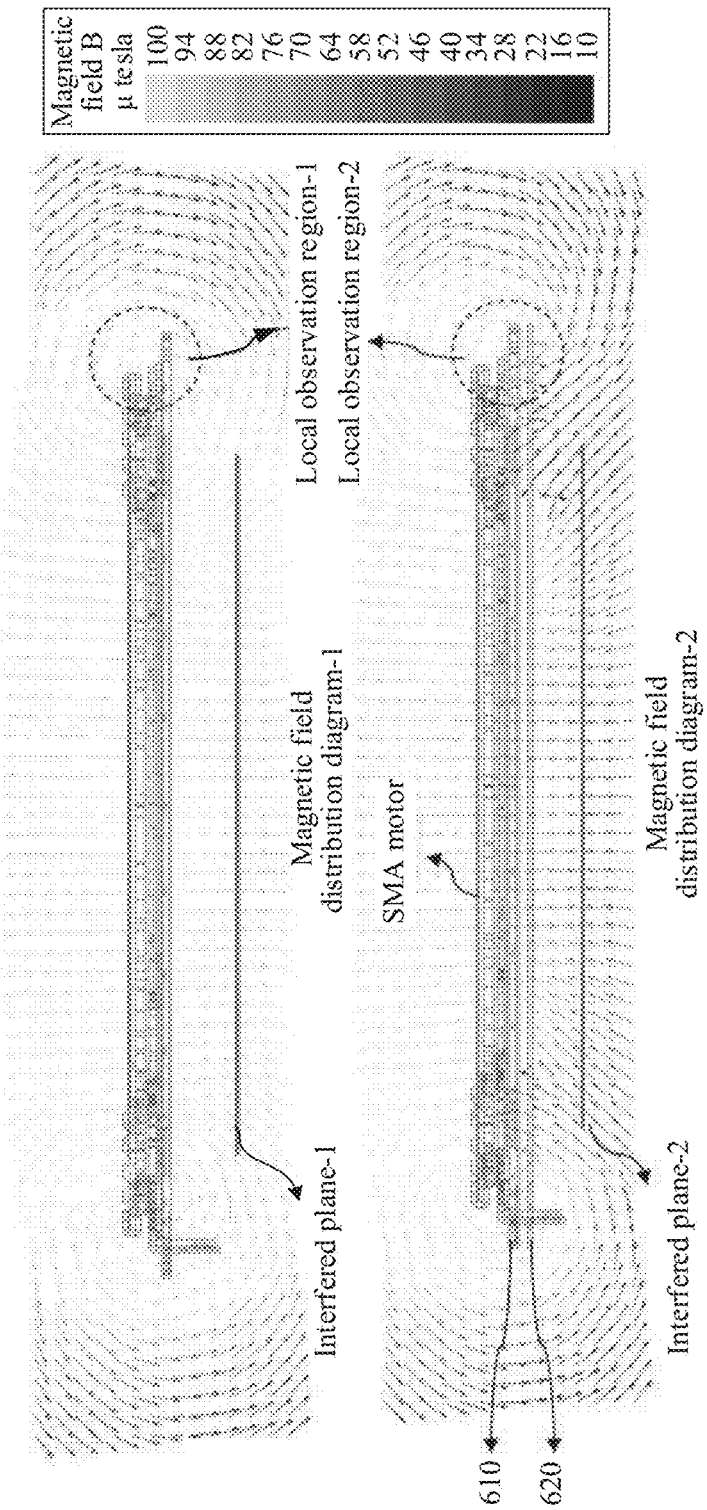
FIG. 16 is a schematic diagram of magnetic field distribution according to an embodiment of this application.

FIG. 16 shows two magnetic field distribution diagrams; a magnetic field distribution diagram-1 and a magnetic field distribution diagram-2. The magnetic field distribution diagram-1 corresponds to the camera compact module 200 shown in FIG. 2. The magnetic field distribution diagram-2 corresponds to the camera compact module 200 shown in FIG. 5, and the magnetic field distribution diagram-2 may include the first magnetic isolation member 620 and the second magnetic isolation member 610 shown in FIG. 5. An interfered plane in FIG. 16 may be a plane on which the image sensor 207 shown in FIG. 2 or FIG. 5 is located. It can be seen from FIG. 16 that, in the magnetic field distribution diagram-1, magnetic field intensity near the interfered plane is larger, and in the magnetic field distribution diagram-2, magnetic field intensity near the interfered plane is smaller.

Figure 17:
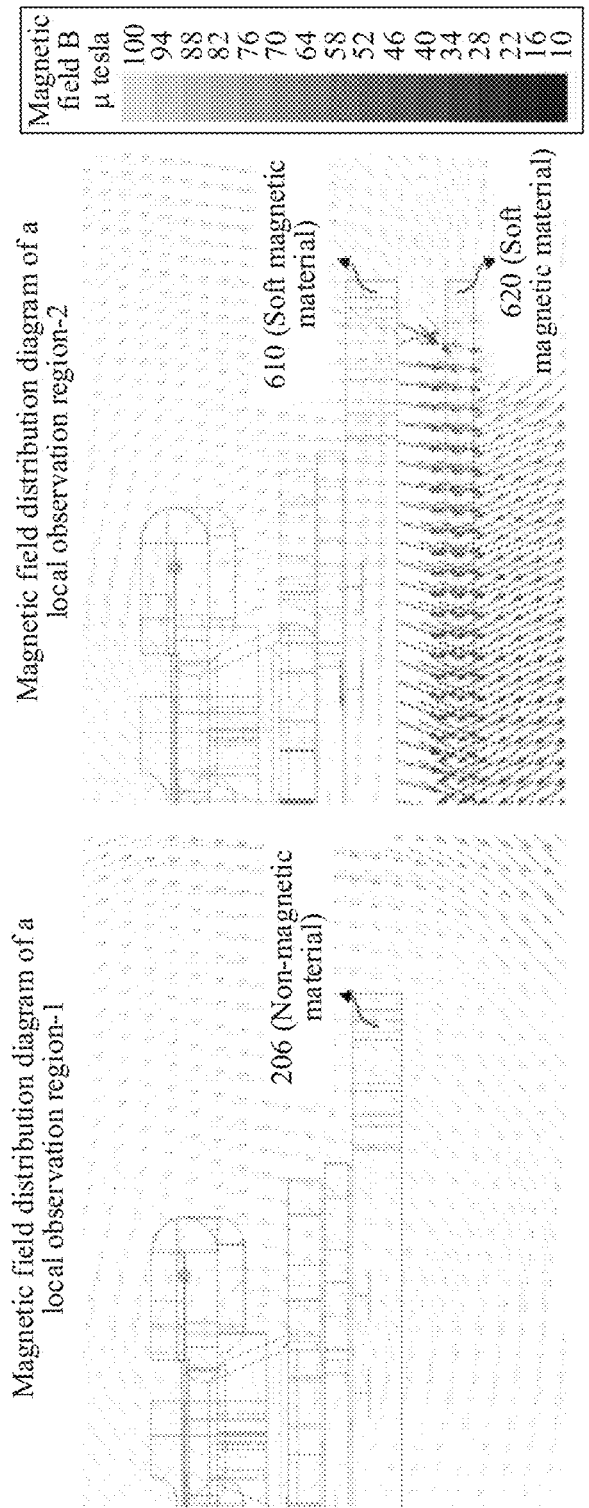
FIG. 17 is a schematic diagram of magnetic field distribution according to an embodiment of this application.

A magnetic field distribution diagram of a local observation region-1 shown in FIG. 17 may be obtained by locally observing a local observation region-1 in FIG. 16. A magnetic field distribution diagram of a local observation region-2 shown in FIG. 17 may be obtained by locally observing a local observation region-2 in FIG. 16. The magnetic field distribution diagram of the local observation region-1 may correspond to the camera compact module 200 shown in FIG. 2. The magnetic field distribution diagram of the local observation region-2 may correspond to the camera compact module 200 shown in FIG. 5. As shown in FIG. 17, the first magnetic isolation member 620 and the second magnetic isolation member 610 shown in FIG. 5 are disposed in the magnetic field distribution diagram of the local observation region-1.

With reference to FIG. 2 and the magnetic field distribution diagram of the local observation region-1, because a material of the holder 206 may be a non-magnetic material, the holder 206 cannot implement a magnetic isolation effect. When an interference magnetic field passes through the holder 206, a magnetic field basically does not change, and phenomena such as an eddy current effect and a magnetic domain direction change basically do not occur in the holder 206.

With reference to FIG. 5 and the magnetic field distribution diagram of the local observation region-2, both the first magnetic isolation member 620 and the second magnetic isolation member 610 are soft magnetic materials. Therefore, a magnetic field change occurs when the interference magnetic field passes through the second magnetic isolation member 610, and the magnetic field change occurs again when the interference magnetic field passes through the first magnetic isolation member 620. In addition, the phenomena such as the eddy current effect and the magnetic domain direction change may occur in both the first magnetic isolation member 620 and the second magnetic isolation member 610.

Figure 18:
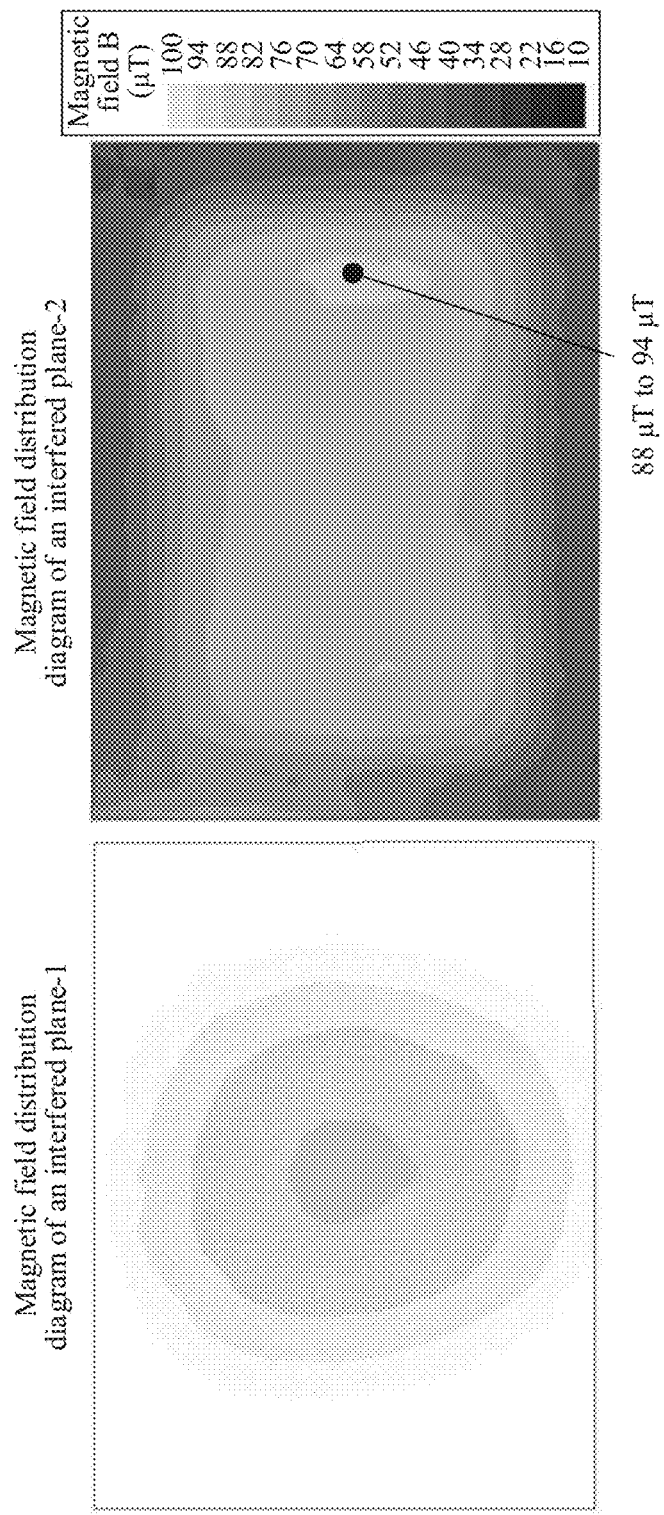
FIG. 18 is a schematic diagram of magnetic field distribution according to an embodiment of this application.

FIG. 18 shows a magnetic field distribution diagram of an interfered plane-1 and a magnetic field distribution diagram of an interfered plane-2. The magnetic field distribution diagram of the interfered plane-1 corresponds to the camera compact module 200 shown in FIG. 2. The magnetic field distribution diagram of the interfered plane-2 corresponds to the camera compact module 200 shown in FIG. 5. It can be seen that the image sensor 207 in FIG. 2 may be subject to an interference magnetic field with higher intensity, and the image sensor 207 in FIG. 5 may be subject to an interference magnetic field with lower intensity.

A plurality of embodiments according to this application in terms of magnetic flux are compared in Table 1. It can be seen that, compared with the camera compact module 200 shown in FIG. 2, in the camera compact module 200 shown in FIG. 5, a magnetic field interference degree to a magnetic sensitive component (including the image sensor 207, the power supply on the circuit board 203, and the like) may be reduced by about 44% to 46%. Compared with a camera compact module using only a single-layer soft magnetic material component, in the camera compact module 200 shown in FIG. 5, the magnetic field interference degree to the magnetic sensitive component may be reduced by about 28% to 42%.

TABLE 1

Magnetic flux comparison

| Embodiment | Analog loop coupling magnetic flux of the image sensor 207/PWb | Surface interference magnetic flux area of the circuit board 203/PWb |
| --- | --- | --- |
| Camera compact module 200 shown in FIG. 2 | 55.35 | 8172.15 |
| Camera compact module 200 in which the holder 206 is a soft magnetic material | 52.41 | 6093.07 |
| Camera compact module 200 shown in FIG. 6 | 30.58 | 4375.83 |

Figure 19:
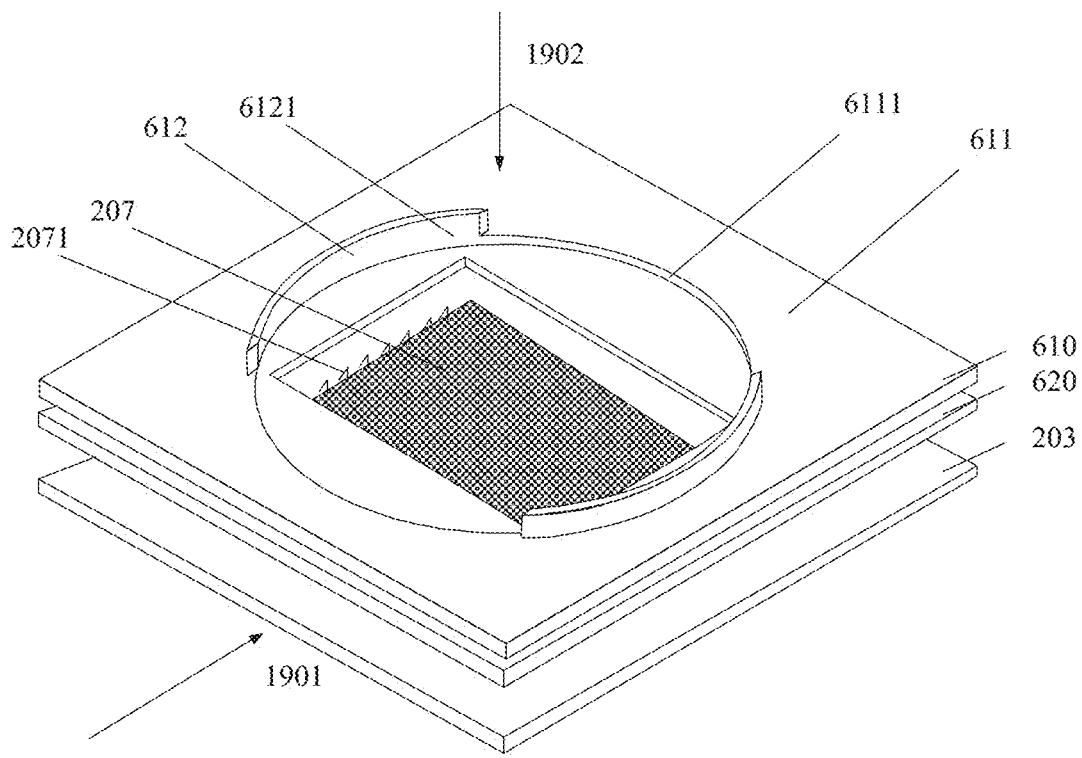
FIG. 19 is a schematic diagram of a three-dimensional structure of a first magnetic isolation member, a second magnetic isolation member, and a circuit board according to an embodiment of this application.
Figure 20:
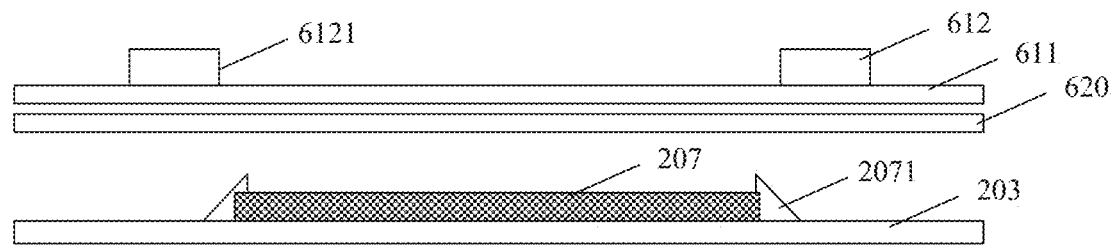
FIG. 20 is a schematic diagram of a structure of a first magnetic isolation member, a second magnetic isolation member, and a circuit board at a first angle of view according to an embodiment of this application.
Figure 21:
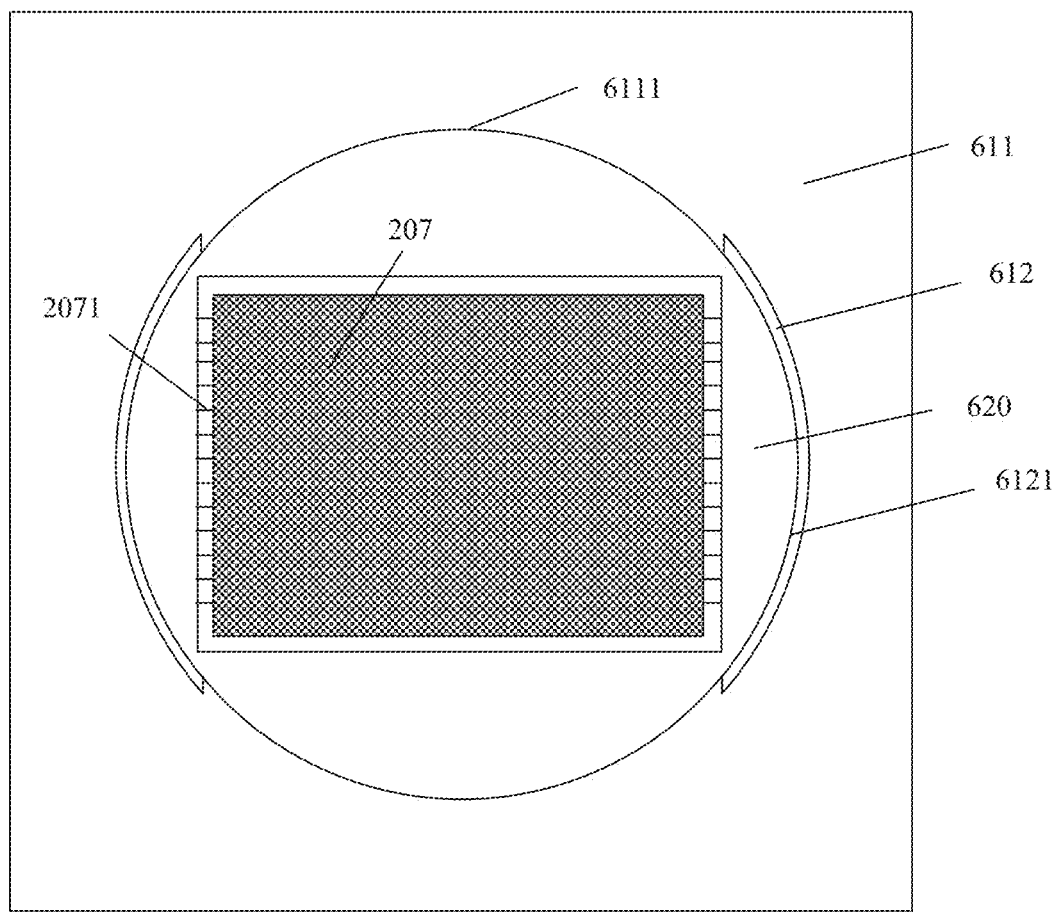
FIG. 21 is a schematic diagram of a structure of a first magnetic isolation member, a second magnetic isolation member, and a circuit board at a second angle of view according to an embodiment of this application.

FIG. 19 to FIG. 21 show another second magnetic isolation member 610 according to an embodiment of this application, and a position relationship among a first magnetic isolation member 620, the second magnetic isolation member 610, and a circuit board 203. FIG. 19 shows a schematic diagram of a three-dimensional structure of the first magnetic isolation member 620, the second magnetic isolation member 610, and the circuit board 203. FIG. 20 shows a schematic diagram of a structure of the first magnetic isolation member 620, the second magnetic isolation member 610, and the circuit board 203 at a first angle of view. The first angle of view may be an observation angle of view (that is, an observation angle of view parallel to an optical axis) shown by an arrow 1901 in FIG. 19. FIG. 21 shows a schematic diagram of a structure of the first magnetic isolation member 620, the second magnetic isolation member 610, and the circuit board 203 at a second angle of view. The second angle of view may be an observation angle of view (that is, an observation angle of view perpendicular to the optical axis) shown by an arrow 1902 in FIG. 19. The second magnetic isolation member 610 shown in FIG. 19 may be used in the camera compact module 200 shown in FIG. 2 or FIG. 5.

Different from the embodiments shown in FIG. 14 and FIG. 15, the second magnetic isolation member 610 shown in FIG. 19 to FIG. 21 may include two second magnetic isolation edges 612, and each second magnetic isolation edge 612 surrounds the periphery of the second through hole 6111 and is disposed perpendicular to the second magnetic isolation board 611. Each second magnetic isolation edge 612 may be in a $1/N_1$ ring shape, where $N_1 > 2$. As shown in FIG. 19, $N_1$ may be, for example, 4, that is, each second magnetic isolation edge 612 is in a ¼ ring shape. An inner wall (that is, a side wall closest to the optical axis of the lens array 2022 shown in FIG. 5) 6121 of each second magnetic isolation edge 612 may be in communication with the hole wall of the second through hole 6111.

In addition, as shown in FIG. 19 to FIG. 21, because pins (or ports) 2071 of the image sensor 207 may be symmetrically disposed relative to a central surface of the image sensor 207, the two second magnetic isolation edges 612 may be symmetrically disposed relative to the central surface of the image sensor 207. In other words, a position of a second magnetic isolation edge 612 on the second magnetic isolation board 611 may be as close as possible to a pin 2071 of the image sensor 207 (for example, the second magnetic isolation edge 612 and the pin 2071 may be located on a same side of the camera compact module 200 shown in FIG. 5), to improve a magnetic isolation effect as much as possible. In other words, in some special scenarios, if the pins 2071 of the image sensor 207 are not symmetrically disposed, the second magnetic isolation edges 612 may also be asymmetrically disposed on the second magnetic isolation board 611.

Figure 22:
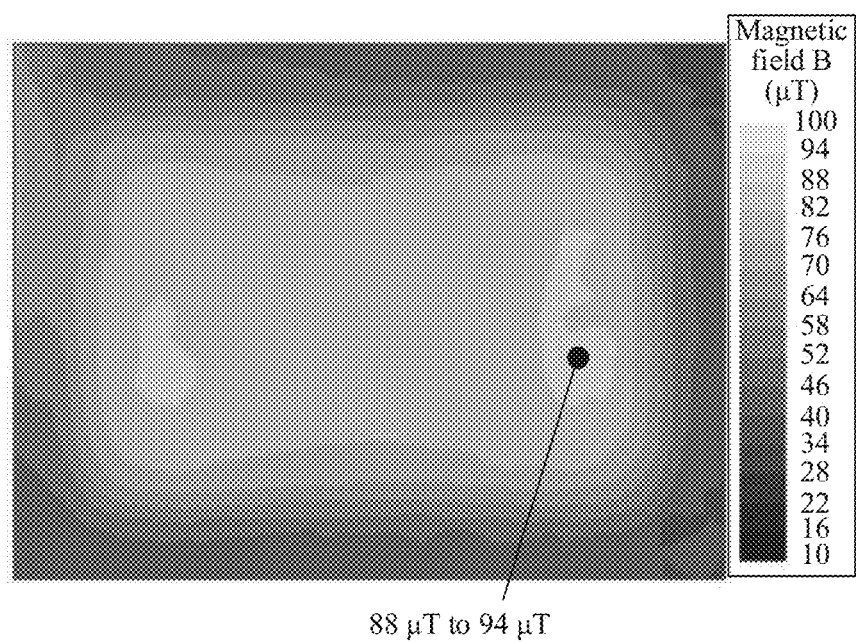
FIG. 22 is a schematic diagram of magnetic field distribution according to an embodiment of this application.

FIG. 22 shows a magnetic field distribution diagram corresponding to the embodiments shown in FIG. 19 to FIG. 21. A plurality of embodiments according to this application in terms of magnetic flux are compared in Table 2. It can be seen that, compared with the embodiment shown in FIG. 2, in the embodiments shown in FIG. 19 to FIG. 21, a magnetic field interference degree to a magnetic sensitive component (including the image sensor 207, the power supply on the circuit board 203, and the like) may be reduced by about 44% to 46%. Compared with an embodiment in which only a single-layer soft magnetic material component is used, in the embodiments shown in FIG. 19 to FIG. 21, the magnetic field interference degree to the magnetic sensitive component may be reduced by about 28% to 42%. It can be learned from the magnetic field distribution diagram shown in FIG. 22 that, the second magnetic isolation edge is disposed at a partial position of the second magnetic isolation board, thereby being conducive to reducing an overall weight of the second magnetic isolation member and basically having no influence on a magnetic isolation effect of the second magnetic isolation member, and further being conducive to flexibly avoiding another component in the camera compact module.

TABLE 2

Magnetic flux comparison

| Embodiment | Analog loop coupling magnetic flux of the image sensor 207/PWb | Surface interference magnetic flux area of the circuit board 203/PWb |
| --- | --- | --- |
| Embodiment shown in FIG. 2 | 55.35 | 8172.15 |
| Embodiment in which the holder 206 is a soft magnetic material | 52.41 | 6093.07 |
| Embodiment shown in FIG. 19 | 30.9 | 4389.53 |

Figure 23:
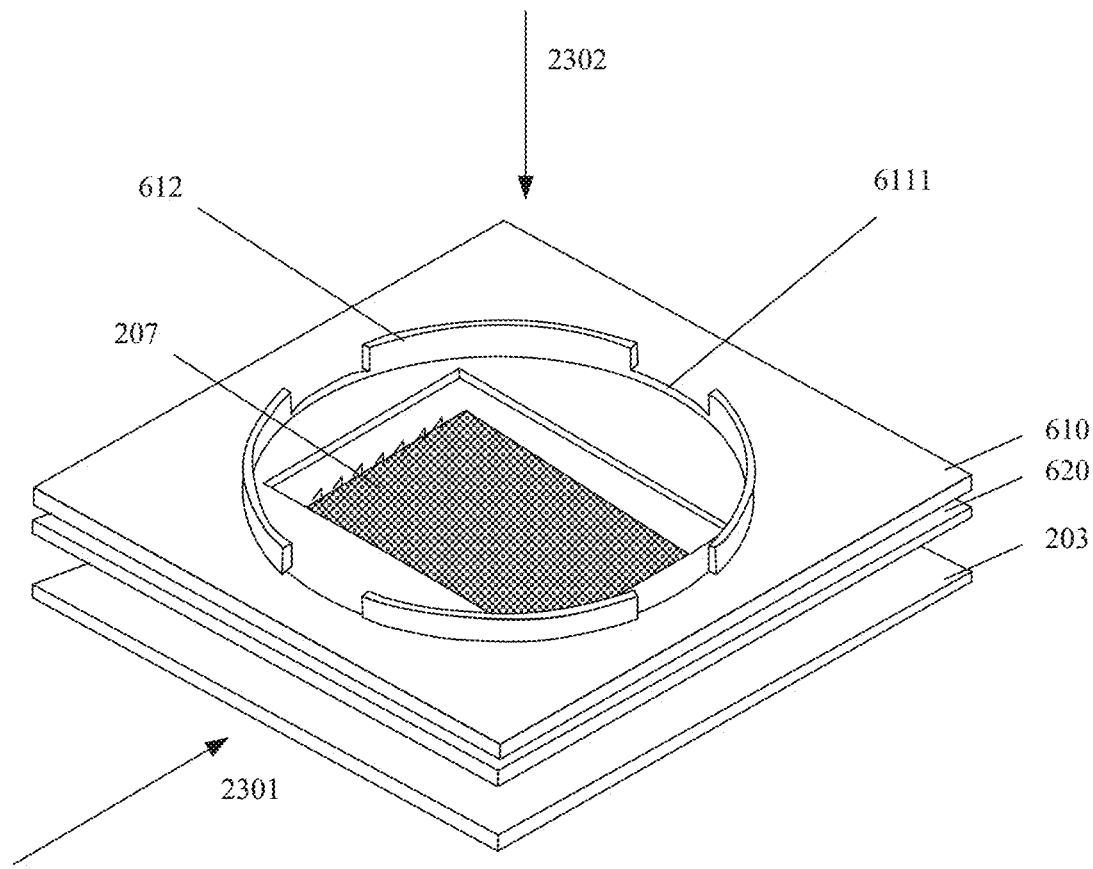
FIG. 23 is a schematic diagram of a three-dimensional structure of a first magnetic isolation member, a second magnetic isolation member, and a circuit board according to an embodiment of this application.
Figure 24:
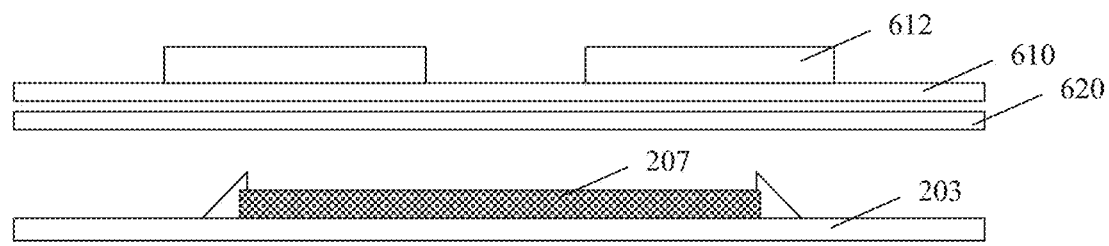
FIG. 24 is a schematic diagram of a structure of a first magnetic isolation member, a second magnetic isolation member, and a circuit board at a first angle of view according to an embodiment of this application.
Figure 25:
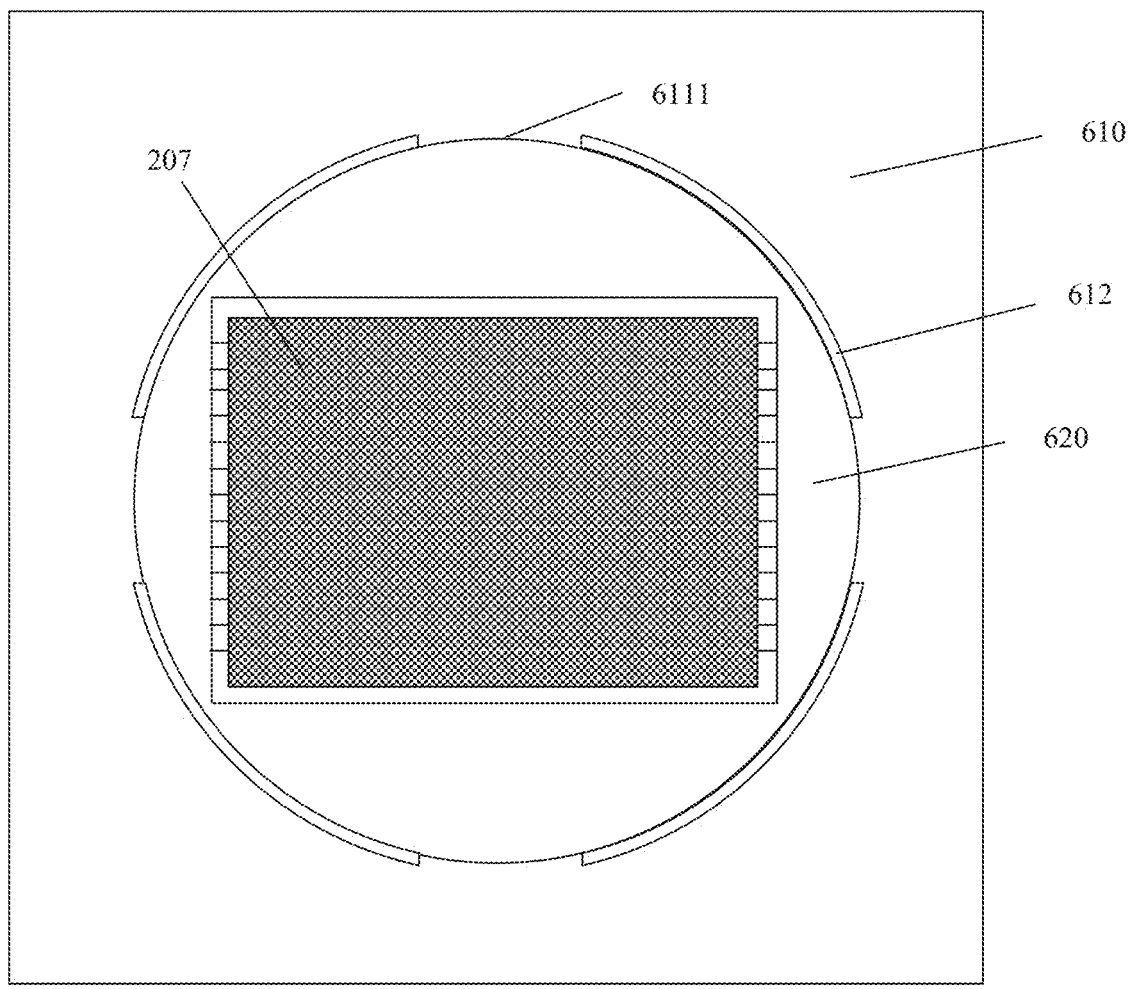
FIG. 25 is a schematic diagram of a structure of a first magnetic isolation member, a second magnetic isolation member, and a circuit board at a second angle of view according to an embodiment of this application.

FIG. 23 to FIG. 25 show still another second magnetic isolation member 610 according to an embodiment of this application, and a position relationship among a first magnetic isolation member 620, the second magnetic isolation member 610, and a circuit board 203. FIG. 23 shows a schematic diagram of a three-dimensional structure of the first magnetic isolation member 620, the second magnetic isolation member 610, and the circuit board 203. FIG. 24 shows a schematic diagram of a structure of the first magnetic isolation member 620, the second magnetic isolation member 610, and the circuit board 203 at a first angle of view. The first angle of view may be an observation angle of view (that is, an observation angle of view parallel to an optical axis) shown by an arrow 2301 in FIG. 23. FIG. 25 shows a schematic diagram of a structure of the first magnetic isolation member 620, the second magnetic isolation member 610, and the circuit board 203 at a second angle of view. The second angle of view may be an observation angle of view (that is, an observation angle of view perpendicular to the optical axis) shown by an arrow 2302 in FIG. 23. The second magnetic isolation member 610 shown in FIG. 23 may be used in the camera compact module 200 shown in FIG. 2 or FIG. 5.

Different from the embodiments shown in FIG. 19 to FIG. 21, the second magnetic isolation member 610 shown in FIG. 23 to FIG. 25 may include more second magnetic isolation edges 612. As shown in FIG. 23, the second magnetic isolation member 610 may include four second magnetic isolation edges 612, and each second magnetic isolation edge 612 may be in a ⅛ to ⅙ ring shape. The four second magnetic isolation edges 612 may be distributed at an equal spacing around the periphery of the second through hole 6111. The four second magnetic isolation edges 612 may be symmetrically disposed relative to the optical axis of the lens array 2022 shown in FIG. 5.

It should be understood that, if regions with strong interference magnetic fields (or magnetic sensitive components) are asymmetrically distributed, because a magnetic isolation effect may be better when the second magnetic isolation edges 612 are closer to the regions with strong interference magnetic fields (or the magnetic sensitive components), the plurality of second magnetic isolation edges 612 on the second magnetic isolation member 610 may also be asymmetrically distributed. Similarly, if the regions with strong interference magnetic fields (or the magnetic sensitive components) are distributed at unequal spacings, the plurality of second magnetic isolation edges 612 on the second magnetic isolation member 610 may also be distributed at unequal spacings.

Figure 26:
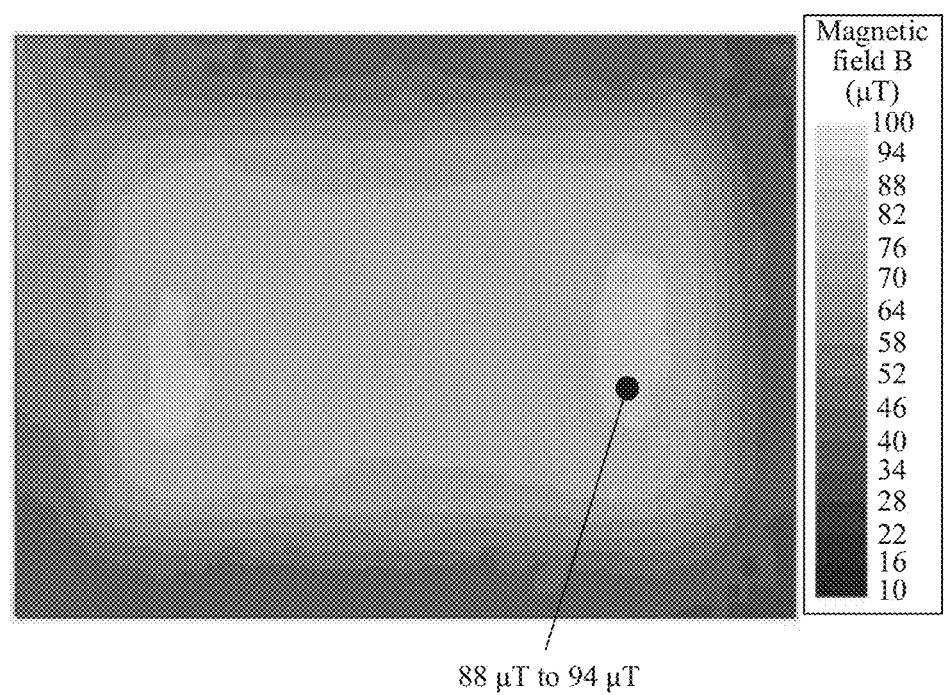
FIG. 26 is a schematic diagram of magnetic field distribution according to an embodiment of this application.

FIG. 26 shows a magnetic field distribution diagram corresponding to the embodiments shown in FIG. 23 to FIG. 25. A plurality of embodiments according to this application in terms of magnetic flux are compared in Table 4. It can be seen that, compared with the embodiment shown in FIG. 2, in the embodiments shown in FIG. 23 to FIG. 25, a magnetic field interference degree to a magnetic sensitive component (including the image sensor 207, the power supply on the circuit board 203, and the like) may be reduced by about 44% to 46%. Compared with an embodiment in which only a single-layer soft magnetic material component is used, in the embodiments shown in FIG. 23 to FIG. 25, the magnetic field interference degree to the magnetic sensitive component may be reduced by about 28% to 42%. It can be seen that the embodiments shown in FIG. 23 to FIG. 25 may be conducive to reducing interference magnetic field to the image sensor 207. It can be learned from the magnetic field distribution diagram shown in FIG. 26 that, the second magnetic isolation edge is disposed in a comb shape on the second magnetic isolation board, thereby being conducive to reducing an overall weight of the second magnetic isolation member, and basically having no influence on a magnetic isolation effect of the second magnetic isolation member, and further being conducive to flexibly avoiding another component in the camera compact module.

TABLE 3

Magnetic flux comparison

| Embodiment | Analog loop coupling magnetic flux of the image sensor 207/PWb | Surface interference magnetic flux area of the circuit board 203/PWb |
| --- | --- | --- |
| Embodiment shown in FIG. 2 | 55.35 | 8172.15 |
| Embodiment in which the holder 206 is a soft magnetic material | 52.41 | 6093.07 |
| Embodiment shown in FIG. 23 | 30.97 | 4379.02 |

It should be understood that a specific quantity of the second magnetic isolation edges 612 may not be limited in this embodiment of this application.

For example, with reference to the embodiments shown in FIG. 19 and FIG. 23, it can be learned that, when n second magnetic isolation edges 612 (n being an integer greater than 1) are disposed on the second magnetic isolation board 611, because the second magnetic isolation edges 612 should be as close as possible to the second through hole 6111, a shape of each second magnetic isolation edge 612 may be a small segment of a complete ring. In addition, because the n second magnetic isolation edges 612 are not connected to each other, when the shapes of the n second magnetic isolation edges 612 are entirely the same, each second magnetic isolation edge 612 may be in a 1/N ring shape, where N>n.

In addition, when there are a larger quantity of second magnetic isolation edges 612, the n second magnetic isolation edges 612 may be arranged to form a comb-shaped magnetic isolation edge assembly.

Figure 27:
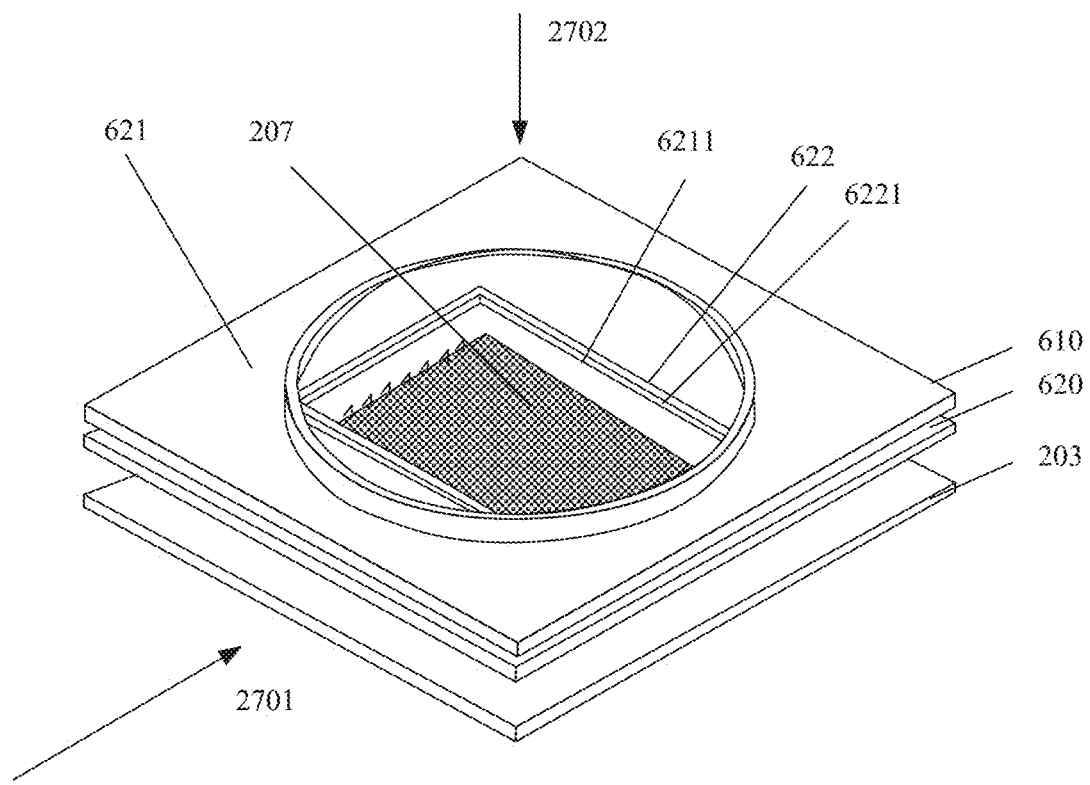
FIG. 27 is a schematic diagram of a three-dimensional structure of a first magnetic isolation member, a second magnetic isolation member, and a circuit board according to an embodiment of this application.
Figure 28:
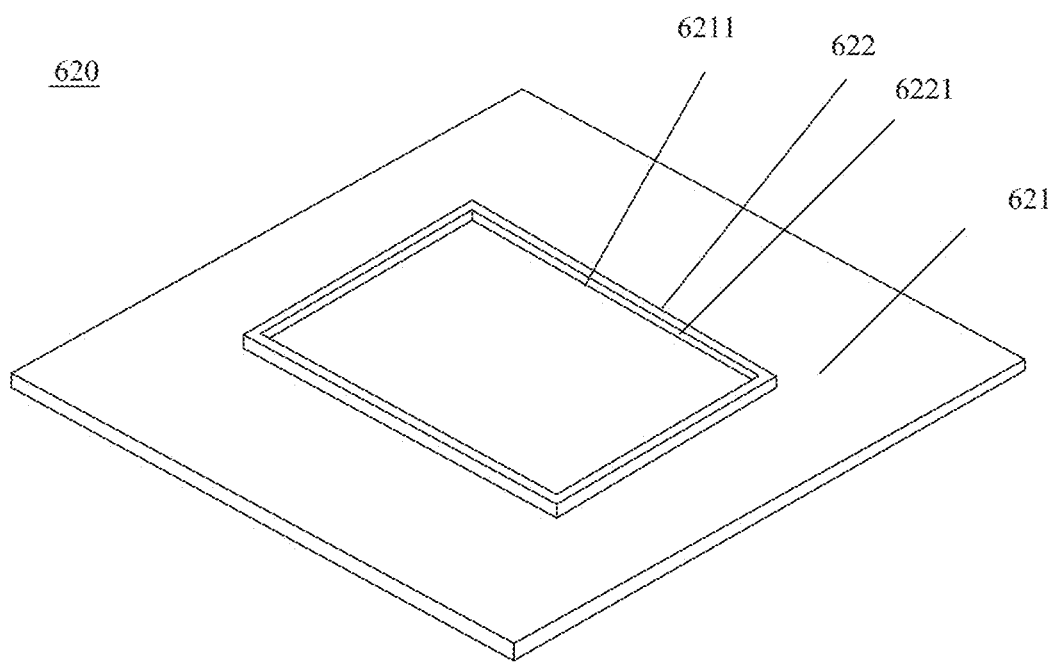
FIG. 28 is a schematic diagram of a structure of a first magnetic isolation member according to an embodiment of this application.
Figure 29:
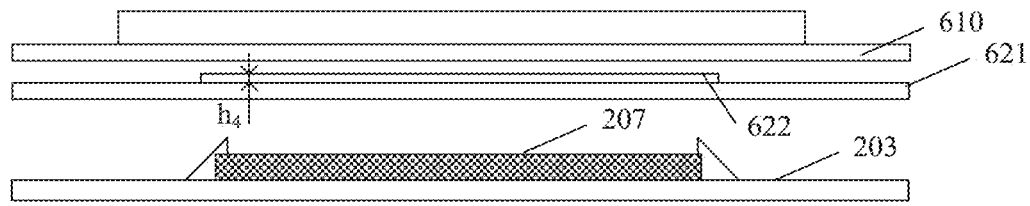
FIG. 29 is a schematic diagram of a structure of a first magnetic isolation member, a second magnetic isolation member, and a circuit board at a first angle of view according to an embodiment of this application.
Figure 30:
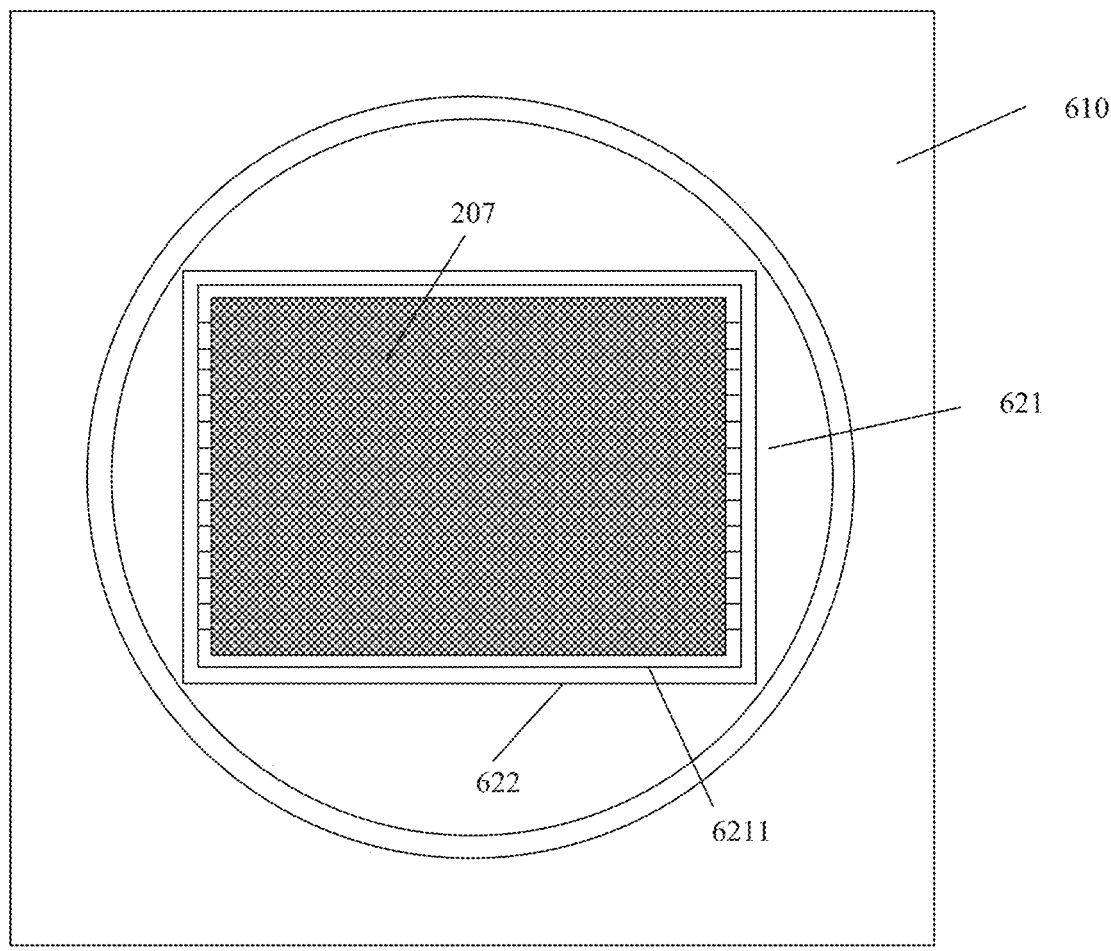
FIG. 30 is a schematic diagram of a structure of a first magnetic isolation member, a second magnetic isolation member, and a circuit board at a second angle of view according to an embodiment of this application.

FIG. 27 to FIG. 30 show another first magnetic isolation member 620 according to an embodiment of this application, and a position relationship among the first magnetic isolation member 620, a second magnetic isolation member 610, and a circuit board 203. FIG. 27 shows a schematic diagram of a three-dimensional structure of the first magnetic isolation member 620, the second magnetic isolation member 610, and the circuit board 203. FIG. 28 shows a schematic diagram of a structure of the first magnetic isolation member 620. FIG. 29 shows a schematic diagram of a structure of the first magnetic isolation member 620, the second magnetic isolation member 610, and the circuit board 203 at a first angle of view. The first angle of view may be an observation angle of view (that is, an observation angle of view parallel to an optical axis) shown by an arrow 2701 in FIG. 27. FIG. 30 shows a schematic diagram of a structure of the first magnetic isolation member 620, the second magnetic isolation member 610, and the circuit board 203 at a second angle of view. The second angle of view may be an observation angle of view (that is, an observation angle of view perpendicular to the optical axis) shown by an arrow 2702 in FIG. 27. The first magnetic isolation member 620 shown in FIG. 27 may be used in the camera compact module 200 shown in FIG. 2 or FIG. 5.

Different from the embodiments shown in FIG. 14 and FIG. 15, the first magnetic isolation member 620 shown in FIG. 27 to FIG. 30 may include a first magnetic isolation edge 622. The first magnetic isolation edge 622 may be disposed perpendicular to the first magnetic isolation board 621. The first magnetic isolation edge 622 may surround a periphery of the first through hole 6211, and is located on a side that is of the first magnetic isolation board 621 and that is away from the image sensor 207. The first magnetic isolation edge 622 may be in a block shape. Optionally, a height $h_4$ of the first magnetic isolation edge 622 may be greater than or equal to 0.01 mm. For example, the height $h_4$ of the first magnetic isolation edge 622 may be 0.1 mm. With reference to FIG. 5 and FIG. 27, the height $h_4$ of the first magnetic isolation edge 622 may be less than a distance between the first magnetic isolation board 621 and the lens array 2022.

As shown in FIG. 28, an inner wall (that is, a side wall of the first magnetic isolation edge 622 closest to the optical axis of the lens array 2022 shown in FIG. 5) 6221 of the first magnetic isolation edge 622 may be in communication with the hole wall of the first through hole 6211. In another example, a step surface is disposed between the inner wall 6221 of the first magnetic isolation edge 622 and the hole wall of the first through hole 6211, and the step surface may be disposed in parallel with the first magnetic isolation board 621.

Figure 31:
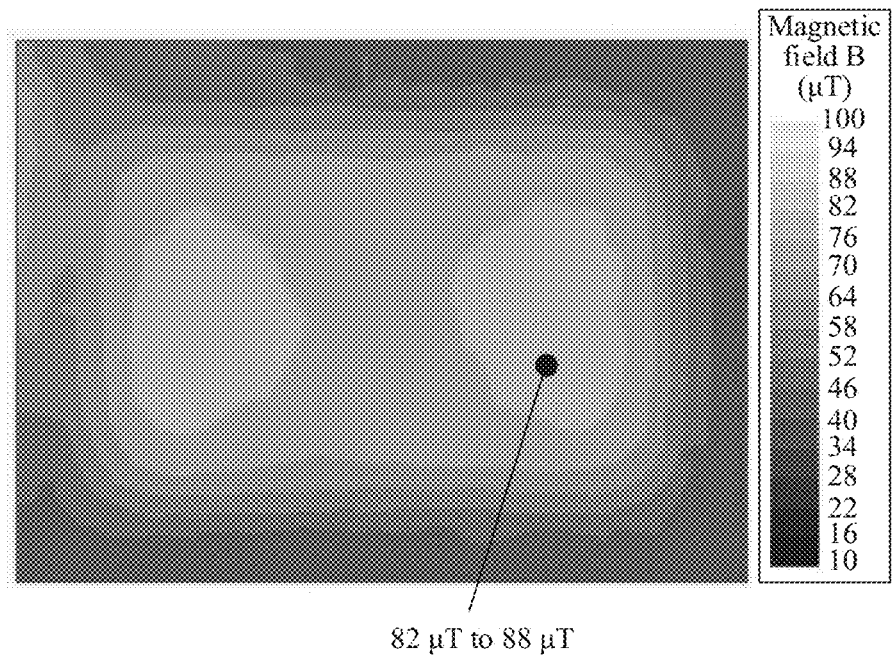
FIG. 31 is a schematic diagram of magnetic field distribution according to an embodiment of this application.

FIG. 31 shows a magnetic field distribution diagram corresponding to the embodiments shown in FIG. 27 to FIG. 30. A plurality of embodiments according to this application in terms of magnetic flux are compared in Table 4. It can be seen that, compared with the embodiment shown in FIG. 2, in the embodiments shown in FIG. 27 to FIG. 30, a magnetic field interference degree to a magnetic sensitive component (including the image sensor 207, the power supply on the circuit board 203, and the like) may be reduced by about 48% to 50%. Compared with an embodiment in which only a single-layer soft magnetic material component is used, in the embodiments shown in FIG. 27 to FIG. 30, the magnetic field interference degree to the magnetic sensitive component may be reduced by about 30% to 47%.

TABLE 4

Magnetic flux comparison

| Embodiment | Analog loop coupling magnetic flux of the image sensor 207/PWb | Surface interference magnetic flux area of the circuit board 203/PWb |
|---|---|---|
| Embodiment shown in FIG. 2 | 55.35 | 8172.15 |
| Embodiment in which the holder 206 is a soft magnetic material | 52.41 | 6093.07 |
| Embodiment shown in FIG. 27 | 27.58 | 4278.74 |

With reference to the embodiments shown in FIG. 19, FIG. 23, and FIG. 27, it can be learned that the first magnetic isolation member 620 may include a plurality of first magnetic isolation edges 622, and each first magnetic isolation edge 622 may be perpendicularly disposed on the first magnetic isolation board 621. Each first magnetic isolation edge 622 may surround a periphery of the first through hole 6211. In an example, the inner wall 6221 of each first magnetic isolation edge 622 may be in communication with the hole wall of the first through hole 6211. In an example, when the first through hole 6211 is a square hole, any first magnetic isolation edge 622 may be in a long strip shape or a corner shape. In an example, the plurality of first magnetic isolation edges 622 may be symmetrically distributed or distributed at an equal spacing. In an example, when there are a larger quantity of first magnetic isolation edges 622, the n first magnetic isolation edges 622 may be arranged to form a comb-shaped magnetic isolation edge assembly.

It should be understood that, if regions with strong interference magnetic fields (or magnetic sensitive components) are asymmetrically distributed, because a magnetic isolation effect may be better when the first magnetic isolation edges 622 are closer to the regions with strong interference magnetic fields (or the magnetic sensitive components), the plurality of first magnetic isolation edges 622 on the first magnetic isolation member 620 may also be asymmetrically distributed. Similarly, if the regions with strong interference magnetic fields (or the magnetic sensitive components) are distributed at unequal spacings, the plurality of first magnetic isolation edges 622 on the first magnetic isolation member 620 may also be distributed at unequal spacings.

Figure 32:
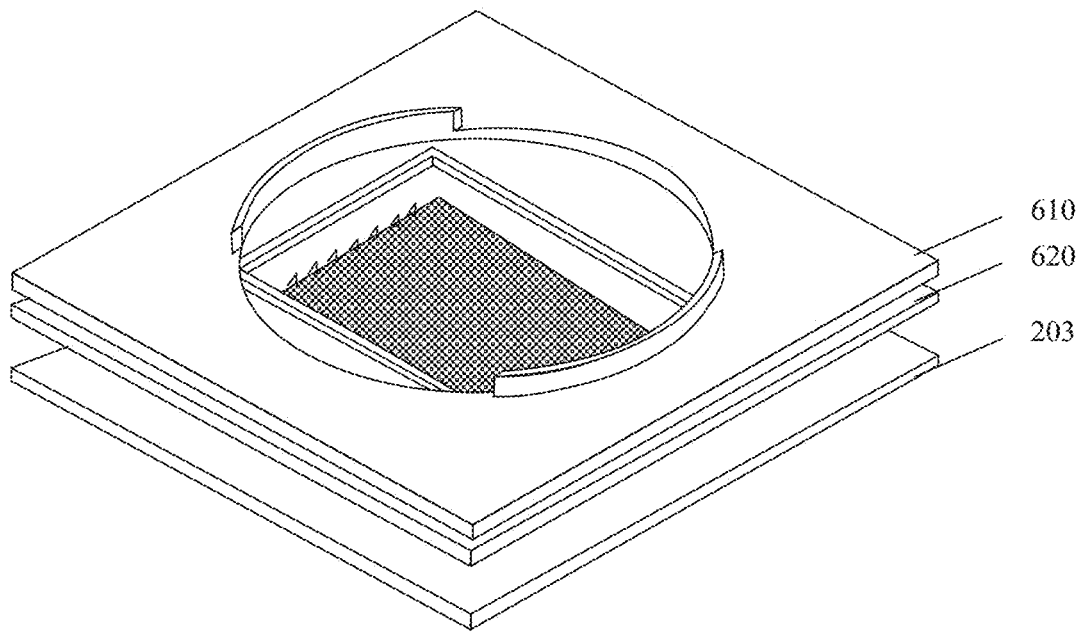
FIG. 32 is a schematic diagram of a structure of a first magnetic isolation member, a second magnetic isolation member, and a circuit board at a first angle of view according to an embodiment of this application.

FIG. 32 shows a position relationship among a first magnetic isolation member 620, a second magnetic isolation member 610, and a circuit board 203 according to an embodiment of this application. For the second magnetic isolation member 610, refer to the embodiment shown in FIG. 19. For the first magnetic isolation member 620, refer to the embodiment shown in FIG. 27. Details are not described herein again.

Figure 33:
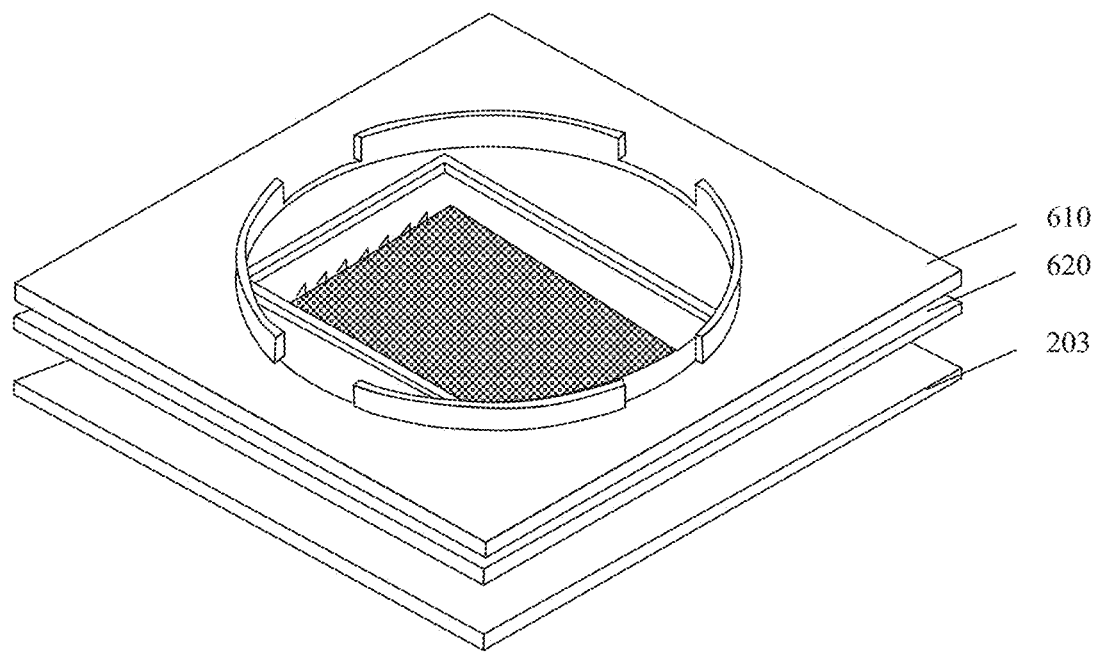
FIG. 33 is a schematic diagram of a structure of a first magnetic isolation member, a second magnetic isolation member, and a circuit board at a first angle of view according to an embodiment of this application.

FIG. 33 shows a position relationship among a first magnetic isolation member 620, a second magnetic isolation member 610, and a circuit board 203 according to an embodiment of this application. For the second magnetic isolation member 610, refer to the embodiment shown in FIG. 23. For the first magnetic isolation member 620, refer to the embodiment shown in FIG. 27. Details are not described herein again.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A shape memory alloy (SMA) motor applied in a photographing apparatus, wherein the SMA motor comprises:
   an SMA cable comprising:
      a first end configured to couple to a lens array of the photographing apparatus and electrically couple to a first electrical connection port of an SMA motor driver system of the photographing apparatus; and
      a second end fixed relative to the photographing apparatus and configured to electrically couple to a second electrical connection port of the SMA motor driver system;
   a first magnetic isolation member disposed perpendicular to an optical axis of the photographing apparatus and comprising a first through hole; and
   a second magnetic isolation member disposed perpendicular to the optical axis, located between the SMA cable and the first magnetic isolation member, and comprising a second through hole configured to pass through the lens array,
   wherein the first through hole is configured to pass a light incident on the photographing apparatus to an image sensor of the photographing apparatus, and
   wherein a first shape of the first through hole corresponds to a second shape of the image sensor.

2. The SMA motor of claim 1, wherein the second through hole comprises a periphery, and wherein the second magnetic isolation member further comprises:
   a magnetic isolation board disposed perpendicular to the optical axis and comprising a side that is located away from the first magnetic isolation member, wherein the second through hole is located on the magnetic isolation board; and at least one magnetic isolation edge perpendicularly disposed on the magnetic isolation board, located on the side, and configured to surround the periphery.

3. The SMA motor of claim 2, wherein the second through hole comprises a hole wall, and wherein the at least one magnetic isolation edge comprises an inner wall coupled with the hole wall.

4. The SMA motor of claim 2, wherein the at least one magnetic isolation edge comprises a target magnetic isolation edge located on a side of the SMA motor.

5. The SMA motor of claim 2, wherein the at least one magnetic isolation edge is:
   symmetrically disposed relative to the second through hole; and
   distributed at an equal spacing on the periphery.

6. The SMA motor of claim 2, wherein the magnetic isolation board satisfies at least one of the following:
   a thickness of the magnetic isolation board is greater than or equal to 0.1 millimeters (mm); or
   a height of the at least one magnetic isolation edge is greater than or equal to 0.1 mm.

7. The SMA motor of claim 1, wherein the SMA motor satisfies at least one of the following:
   a relative magnetic permeability of the second magnetic isolation member is greater than 5; or
   a distance between the second magnetic isolation member and the first magnetic isolation member is greater than or equal to 0.1 millimeters (mm).

8. The SMA motor of claim 1, wherein the first through hole comprises a periphery, and wherein the first magnetic isolation member further comprises:
   a magnetic isolation board disposed perpendicular to the optical axis and comprising a side proximate to the SMA cable, wherein the first through hole is located on the magnetic isolation board; and
   at least one magnetic isolation edge located on the side, disposed perpendicular to the magnetic isolation board, and surrounding the periphery.

9. The SMA motor of claim 8, wherein the first through hole further comprises a hole wall, and wherein the at least one magnetic isolation edge comprises an inner wall coupled to the hole wall.

10. The SMA motor of claim 1, wherein the SMA motor satisfies at least one of the following:
    a relative magnetic permeability of the first magnetic isolation member is greater than 5;
    a first distance between the first magnetic isolation member and the image sensor is greater than or equal to 0.1 millimeters (mm);
    a second distance between the first magnetic isolation member and a circuit board of the photographing apparatus that the image sensor is disposed on is greater than or equal to 0.1 mm; or
    an outer contour of a projection region of the first through hole on the circuit board is a first outer contour, an outer contour of a projection region of the image sensor on the circuit board is a second outer contour, wherein the second outer contour is located in the first outer contour, and wherein a maximum distance between the second outer contour and the first outer contour is less than or equal to 1.5 mm.

11. The SMA motor of claim 1, further comprising a holder configured to be disposed next to the image sensor, wherein the holder comprises a surface, and wherein the first magnetic isolation member is located in the holder or is attached to the surface.

12. A shape memory alloy (SMA) motor implemented in a photographing apparatus, the SMA motor comprises:
    an SMA cable comprising:
        a first end configured to couple to a lens array of the photographing apparatus and electrically couple to a first electrical connection port of an SMA motor driver system of the photographing apparatus; and
        a second end fixed relative to the photographing apparatus and configured to electrically couple to a second electrical connection port of the SMA motor driver system;
    a magnetic isolation member comprising:
        a magnetic isolation board disposed perpendicular to an optical axis of the photographing apparatus and comprising:
            a side proximate to the SMA cable; and
            a through hole configured to:
                pass through the lens array; and
                pass a light incident on the photographing apparatus to an image sensor of the photographing apparatus; and
        at least one magnetic isolation edge perpendicularly disposed on the magnetic isolation board and located on the side; and
    a second magnetic isolation board disposed perpendicular to the optical axis, located between the SMA cable and the first magnetic isolation board, and comprising a second through hole configured to pass through the lens array.

13. The SMA motor of claim 12, wherein the at least one magnetic isolation edge comprises a target magnetic isolation edge, and wherein the target magnetic isolation edge and a pin of the image sensor are located on a same side of the SMA motor.

14. An electronic device comprising:
    a lens array;
    an image sensor;
    a shape memory alloy (SMA) motor; and
    an SMA driver system configured to provide an alternating current power supply to the SMA motor and comprising:
        a first electrical connection port; and
        a second electrical connection port,
    wherein the SMA motor comprises:
        an SMA cable comprising:
            a first end coupled to the lens array and electrically coupled to the first electrical connection port; and
            a second end fixed relative to the electronic device and electrically coupled to the second electrical connection port;
        a first magnetic isolation member disposed perpendicular to an optical axis of the electronic device, and comprising a first through hole; and
        a second magnetic isolation member disposed perpendicular to the optical axis, located between the SMA cable and the first magnetic isolation member, and comprising a second through hole configured to pass through the lens array,
    wherein the through hole is configured to pass a light incident on the electronic device to the image sensor, and
    wherein a first shape of the first through hole corresponds to a second shape of the image sensor.

15. The electronic device of claim 14, wherein the second through hole comprises a periphery, and wherein the second magnetic isolation member comprises:
- a magnetic isolation board disposed perpendicular to the optical axis and comprising a side located away from the first magnetic isolation member, wherein the second through hole is located on the magnetic isolation board; and
- at least one magnetic isolation edge perpendicularly disposed on the magnetic isolation board, located on the side, and surrounding the periphery.

16. The electronic device of claim 15, wherein the second through hole comprises a hole wall, and wherein the at least one magnetic isolation edge comprises an inner wall coupled to the hole wall.

17. The electronic device of claim 15, wherein the image sensor comprises a pin, and wherein the at least one magnetic isolation edge comprises a target magnetic isolation edge, and wherein the target magnetic isolation edge and the pin are located on a same side of the SMA motor.

18. The electronic device of claim 15, wherein the at least one magnetic isolation edge is:
- symmetrically disposed relative to the second through hole; and
- distributed at an equal spacing on the periphery.

19. The electronic device of claim 15, wherein the magnetic isolation board satisfies at least one of the following:
- a thickness of the magnetic isolation board is greater than or equal to 0.1 millimeters (mm); or
- a height of the at least one magnetic isolation edge is greater than or equal to 0.1 mm.

20. The electronic device of claim 14, further comprising a holder configured to be disposed next to the image sensor, wherein the holder comprises a surface, and wherein the first magnetic isolation member is located in the holder or is attached to the surface.

* * * * *